(12) United States Patent
Moon et al.

(10) Patent No.: US 10,333,654 B2
(45) Date of Patent: Jun. 25, 2019

(54) METHOD FOR SUPPORTING HARQ IN COMMUNICATION SYSTEM USING UNLICENSED FREQUENCY BAND AND DEVICE HAVING APPLIED SAME

(71) Applicant: Samsung Electronics Co., Ltd., Gyeonggi-do (KR)

(72) Inventors: Jung-Min Moon, Suwon-si (KR); Seung-Hoon Park, Seoul (KR); Jung-Soo Jung, Seongnam-si (KR); Sun-Heui Ryoo, Yongin-si (KR); Byoung-Hoon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/565,399

(22) PCT Filed: Mar. 31, 2016

(86) PCT No.: PCT/KR2016/003361
§ 371 (c)(1),
(2) Date: Oct. 9, 2017

(87) PCT Pub. No.: WO2016/163690
PCT Pub. Date: Oct. 13, 2016

(65) Prior Publication Data
US 2018/0131473 A1    May 10, 2018

Related U.S. Application Data

(60) Provisional application No. 62/145,072, filed on Apr. 9, 2015.

(51) Int. Cl.
*H04W 4/00* (2018.01)
*H04L 1/18* (2006.01)
(Continued)

(52) U.S. Cl.
CPC ............ *H04L 1/1812* (2013.01); *H04L 1/18* (2013.01); *H04L 5/0044* (2013.01);
(Continued)

(58) Field of Classification Search
CPC ....... H04L 1/1812; H04L 5/0055; H04L 1/18; H04L 5/00; H04W 72/0413; H04W 72/0453; H04W 74/004; H04W 16/14
See application file for complete search history.

(56) References Cited

U.S. PATENT DOCUMENTS

2012/0057529 A1* 3/2012 Seo ................ H04L 1/1835
                                        370/328
2014/0362780 A1* 12/2014 Malladi .......... H04W 16/14
                                        370/329

(Continued)

FOREIGN PATENT DOCUMENTS

WO       2010110607 A2    9/2010

*Primary Examiner* — Clemence S Han

(57) ABSTRACT

The present invention relates to 5G or pre-5G communication system for supporting a higher data transmission rate after 4G communication system such as LTE. The present invention provides a method and a device for executing a hybrid automatic repeat request (HARQ) through a channel in an unlicensed frequency band. More particularly, a method for executing a HARQ through a channel in an unlicensed frequency band in a terminal of a communication system comprises the procedures of: requesting uplink scheduling; if a first uplink (UL) grant with respect to the scheduling request is received, sensing whether or not a channel is clear; transmitting first uplink data on the basis of whether or not the channel is clear; if negative acknowledge (NACK) with respect to the first uplink grant and a second uplink grant are received, sensing whether or not the channel is clear; and transmitting second uplink data and an indicator, which indicates whether or not the second uplink data transmission is a retransmission, on the basis of whether or (Continued)

not the channel is clear, wherein the indicator, which indicates for retransmission, is determined on the basis of a reference signal (RS) detection failure indicator, of a base station, which is transmitted from the base station together with the second uplink grant.

18 Claims, 18 Drawing Sheets

(51) Int. Cl.
*H04L 5/00* (2006.01)
*H04W 72/04* (2009.01)
*H04W 74/00* (2009.01)
*H04W 16/14* (2009.01)

(52) U.S. Cl.
CPC .......... *H04L 5/0051* (2013.01); *H04L 5/0055* (2013.01); *H04W 72/0413* (2013.01); *H04W 72/0453* (2013.01); *H04W 74/004* (2013.01); *H04L 5/001* (2013.01); *H04W 16/14* (2013.01)

(56) References Cited

U.S. PATENT DOCUMENTS

| | | | |
|---|---|---|---|
| 2015/0049712 A1* | 2/2015 | Chen | H04W 72/1215 370/329 |
| 2015/0055589 A1* | 2/2015 | Yerramalli | H04L 1/1861 370/329 |
| 2015/0084643 A1* | 3/2015 | Yamashita | G01R 31/024 324/551 |
| 2015/0092702 A1* | 4/2015 | Chen | H04W 72/082 370/329 |
| 2016/0255648 A1* | 9/2016 | Frenne | H04L 5/0048 370/329 |
| 2018/0049234 A1* | 2/2018 | Lee | H04L 1/18 |
| 2018/0227938 A1* | 8/2018 | Lee | H04L 5/00 |

* cited by examiner

FIG. 7A

| S0 | S1 | S2 | S3 | S4 | S5 | S6 | S7 | S8 | S9 | S10 | S11 | S12 | S13 |
|---|---|---|---|---|---|---|---|---|---|---|---|---|---|
| CQI | CQI | CQI | RS | CQI | CQI | CQI | CQI | CQI | CQI | RS | CQI | CQI | CQI |
| | | CQI | RS | CQI | | | | | | RS | | | |
| | | | RS | | | | | | | RS | | | |
| | | | RS | | | | | | | RS | | | |
| NDI-UE | RI | AN | RS | AN | RI | NDI-UE | | RI | AN | RS | AN | RI | |
| NDI-UE | RI | AN | RS | AN | RI | NDI-UE | | RI | AN | RS | AN | RI | |
| NDI-UE | RI | AN | RS | AN | RI | NDI-UE | | RI | AN | RS | AN | RI | |

FIG. 7B

| S0 | S1 | S2 | S3 | S4 | S5 | S6 | S7 | S8 | S9 | S10 | S11 | S12 | S13 |
|---|---|---|---|---|---|---|---|---|---|---|---|---|---|
| CQI | CQI | CQI | RS | CQI | NDI-UE | CQI | NDI-UE | CQI | CQI | RS | CQI | CQI | CQI |
| CQI | CQI | CQI | RS | CQI | NDI-UE | NDI-UE | | | | RS | | | |
| | | | RS | | | | | | | RS | | | |
| | | | RS | | | | | | | RS | | | |
| | RI | AN | RS | AN | RI | | | RI | AN | RS | AN | RI | |
| | RI | AN | RS | AN | RI | | | RI | AN | RS | AN | RI | |
| | RI | AN | RS | AN | RI | | | RI | AN | RS | AN | RI | |

# METHOD FOR SUPPORTING HARQ IN COMMUNICATION SYSTEM USING UNLICENSED FREQUENCY BAND AND DEVICE HAVING APPLIED SAME

CROSS-REFERENCE TO RELATED APPLICATIONS AND CLAIM OF PRIORITY

This application is a National Phase Entry of PCT International Application No. PCT/KR2016/003361, which was filed on Mar. 31, 2016, entitled "METHOD FOR SUPPORTING HARQ IN COMMUNICATION SYSTEM USING UNLICENSED FREQUENCY BAND AND DEVICE HAVING APPLIED SAME", and claims priority to U.S. Patent Application No. 62/145,072, filed on Apr. 9, 2015, the contents of which are incorporated herein by reference.

TECHNICAL FIELD

The present disclosure relates to a hybrid automatic repeat request (HARQ) method and an apparatus adopting the same in a communication system using an unlicensed frequency band.

BACKGROUND

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

A frequency band is roughly classified into a licensed frequency band (i.e., a permitted frequency band) and an unlicensed frequency band (i.e., a frequency band for which permission is not required), depending on whether an exclusive right for its use is granted to a particular operator. The licensed frequency band is available only by the particular operator, such that the particular operator may transmit and receive data at a desired point in time. On the other hand, the unlicensed frequency band is available to everyone, such that an operator (or device) that is to use the unlicensed frequency band needs to use the unlicensed frequency band after determining whether there is no operator (or device) currently using the unlicensed frequency band.

FIG. 1 is a flowchart of a process in which a terminal transmits data or a control signal to a base station in a communication system using a licensed frequency band.

A terminal 103 sends a scheduling request to a base station 101 in operation 111. The scheduling request means a request for a resource that is used for the terminal 103 to transmit data or a control signal to the base station 101 in an uplink (UL). The base station 101 performs scheduling in response to the scheduling request of the terminal 103 and transmits a scheduling result to the terminal 103 in operation 113. The scheduling result may be, for example, an UL grant. If the base station 101 sends the UL grant to the terminal 103, the base station 101 may allocate a point in time to transmit data, etc., a frequency resource, and so forth to the terminal 103. The terminal 103 having received the UL grant transmits the data at the point in time allocated by the base station 101 in operation 115. The base station 101 receives and decodes the data transmitted from the terminal 103. Once the decoding has been successfully performed, the base station 101 sends an acknowledge (ACK) signal to the terminal 103. However, if the decoding has failed, the base station 101 sends a negative acknowledge (NACK) signal to the terminal 103. Even if the decoding has failed, the base station 101 soft-combines the received data with subsequently re-transmitted data without discarding the received data, thereby increasing the success rate of data reception.

Such a scheme for increasing the success rate of data reception by soft-combining previously received data with re-transmitted data without discarding the received data is referred to as a hybrid automatic repeat request (HARQ) scheme. The HARQ scheme may be roughly classified into a synchronous HARQ scheme and an asynchronous HARQ scheme. In the synchronous HARQ scheme, a base station is synchronized with a terminal by fixing a point in time when the base station sends an ACK or NACK signal to the terminal and a point in time when the terminal transmits new data or re-transmits existing data to the base station. Thus, the base station or terminal using the synchronous HARQ scheme does not need to transmit information about a point in time to transmit data and a point in time to send an ACK or NACK signal.

On the other hand, in the asynchronous HARQ scheme, the terminal and the base station inform each other of points in time to transmit data before transmitting the data, and then transmit the data at the informed points in time. That is, in the asynchronous HARQ scheme, the data transmission points in time may be flexible.

FIG. 2 is a diagram showing an example of exchange of data and an ACK/NACK signal between a base station and a terminal that use the synchronous HARQ scheme.

Referring to FIG. 2, once the terminal transmits UL data in 201, 203, and 205, the base station sends an ACK or NACK signal indicating a decoding result with respect to the data to the terminal in 211, 213, and 215 after three subframes 231. The terminal then transmits new data or re-transmits previous data in 221, 223, and 225 after three subframes 233 according to the decoding result. The number of subframes, 3, is a preset value, and may be changed.

FIG. 3 is a flowchart showing transmission and reception of data or a control signal between a terminal and a base station that use the synchronous HARQ scheme in an unlicensed frequency band.

FIG. 3A is a flowchart showing a case where any device does not use the unlicensed frequency band at a point in time when the terminal is to use the unlicensed frequency band.

FIG. 3B is a flowchart showing a case where a device uses the unlicensed frequency band at a point in time when the terminal is to use the unlicensed frequency band.

A process in which the terminal 103 sends a scheduling request to the base station 101 in operation 111 and thus the base station 101 sends a UL grant to the terminal 103 in operation 113 is the same as shown in FIG. 1, and thus will not be described now. However, FIG. 3 is different from FIG. 1 in a sense that the base station 101 allocates the unlicensed frequency band to the terminal 103.

The terminal 103, because of using the synchronous HARQ scheme, checks a state of the unlicensed frequency band at a preset point in time. That is, to avoid interference or collision with another device, before sending a signal, the terminal 103 may perform listen before talk (LBT)-based clear channel assessment (CCA) which includes sensing a power level of a channel or carrier in the unlicensed frequency band to be used and determining whether the channel or carrier is available. If the channel is in a clear state, the terminal 103 may send a signal. However, if the channel is in a busy state, the terminal 103 may not send a signal. Depending on a scheme for performing LBT, a device may be classified into frame based equipment (FBE) and load based equipment (LBE). Hereinbelow, performing CCA may have the same meaning as performing LBT.

In FIG. 3A, a state of the unlicensed frequency band (i.e., a channel state of the unlicensed frequency band) is a state where any device does not use the unlicensed frequency band, that is, a clear state 301. On the other hand, in FIG. 3B, the state of the unlicensed frequency band is a state where another device uses the unlicensed frequency band, that is, a busy state 311.

When the unlicensed frequency band is in the clear state, operation 115 where the terminal 103 transmits data and operation 117 where the base station 101 sends an ACK or NACK signal are the same as operations 115 and 117 of FIG. 1.

In contrast, when the unlicensed frequency band is in the busy state, the terminal 103 may not transmit data at a preset point in time as in 313. However, the base station 101 determines that the terminal 103 surely transmits data, and thus performs decoding, but fails. The base station 101 having failed in the decoding sends a NACK signal to the terminal 103 in operation 315.

As described with reference to FIG. 3, since the unlicensed frequency band may be in the busy state at a preset point in time, a problem may occur as below. Particularly, in the synchronous HARQ scheme where points in time to transmit data, etc., are preset by synchronization, the transmission points in time may not be freely changed, making it difficult to use the synchronous HARQ scheme in the unlicensed frequency band.

For example, the terminal 103 may distinguish the NACK signal sent in operation 117 of FIG. 3A from the NACK signal sent in operation 315 of FIG. 3B. In FIG. 3A, since the terminal 103 has transmitted data, the base station 101 may soft-combine the received data with re-transmitted data without discarding the received data, thus increasing a decoding success rate. In FIG. 3B, the terminal 103 does not transmit data, such that data received by the base station 101 may be an interference or noise signal that needs to be discarded. The problem occurs because the base station 101 does not know whether the terminal 103 has transmitted data. That is, since the base station 101 does not know whether to discard data received from the terminal 103 or to store the received data in a buffer for soft-combination, the problem occurs.

SUMMARY

The present disclosure provides an efficient HARQ scheme. In particular, the present disclosure solves a problem occurring when data fails to be transmitted at a scheduled point in time in a communication system using an unlicensed frequency band.

According to an aspect of the present disclosure, there is provided a method for performing a hybrid automatic repeat request (HARQ) through a channel of an unlicensed frequency band by a terminal in a communication system, the method including requesting uplink (UL) scheduling, sensing whether the channel is clear, upon receiving a first UL grant with respect to the scheduling request, transmitting first UL data according to whether the channel is clear, sensing whether the channel is clear, upon receiving a negative acknowledge (NACK) with respect to the first UL grant and a second UL grant, and transmitting second UL data and an indicator indicating whether the second UL data is re-transmitted data, according to whether the channel is clear, in which the indicator indicating whether the second UL data is re-transmitted data is determined based on a reference signal (RS) detection failure indicator of the base station transmitted together with the second UL grant from the base station.

According to another aspect of the present disclosure, there is provided a method for performing a HARQ through a channel of an unlicensed frequency band by a base station in a communication system, the method including transmitting a first UL grant with respect to an UL scheduling request of a terminal, receiving data in response to the first UL grant, detecting an RS of the received data, transmitting an indicator indicating whether the detecting of the RS fails to the terminal, transmitting a second UL grant depending on whether the detecting of the RS fails, receiving second UL data and an indicator indicating whether the second UL data is re-transmitted data, in response to the second UL grant, and processing the second UL data according to the indicator indicating whether the second UL data is re-transmitted data.

According to another aspect of the present disclosure, there is provided a terminal of a communication system for performing a HARQ through a channel of an unlicensed frequency band, the terminal including a transmitter configured to request UL scheduling, to transmit first UL data according to whether the channel is clear, to transmit second UL data and an indicator indicating whether the second UL data is re-transmitted data, according to whether the channel is clear, and a controller configured to sense whether the channel is clear, upon receiving a first UL grant with respect to the scheduling request, and to sense whether the channel is clear, upon receiving an NACK with respect to the first UL grant and a second UL grant, in which the indicator indicating whether the second UL data is re-transmitted data is determined based on an RS detection failure indicator of the base station transmitted together with the second UL grant from the base station.

According to another aspect of the present disclosure, there is provided a base station of a communication system for performing a HARQ through a channel of an unlicensed frequency band, the base station including a transmitter configured to transmit a first UL grant with respect to an UL scheduling request of a terminal, to transmit an indicator indicating whether the detecting of the RS fails to the terminal, and to transmit a second UL grant depending on whether the detecting of the RS fails, a receiver configured to receive data in response to the first UL grant and to receive second UL data and an indicator indicating whether the second UL data is re-transmitted data, in response to the second UL grant, and a controller configured to detect an RS of the received data and to process the second UL data according to the indicator indicating whether the second UL data is re-transmitted data.

The present disclosure may have effects when a transmission apparatus fails to transmit data at a scheduled point in time in a communication system using an unlicensed frequency band.

BRIEF DESCRIPTION OF THE DRAWINGS

FIGS. 7A and 7B show examples where a terminal simultaneously transmits an indicator and data to a base station;

DETAILED DESCRIPTION

Figure 1:
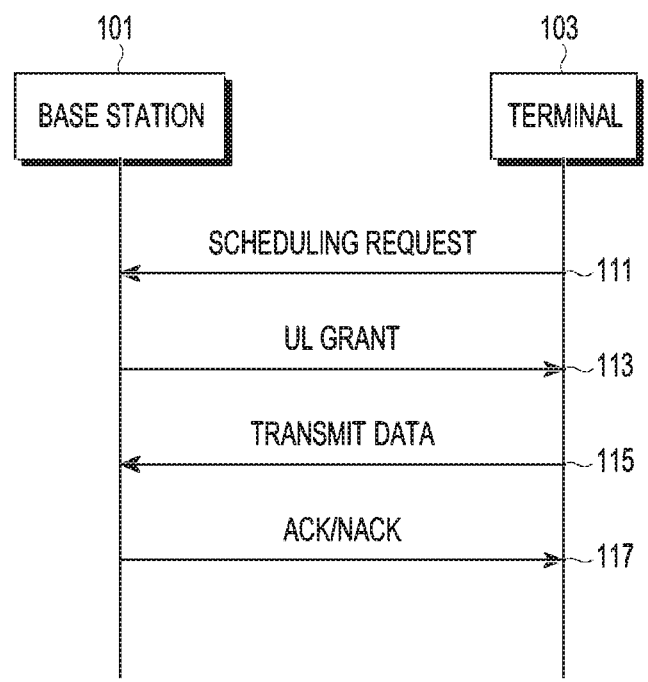
FIG. 1 is a flowchart of a process in which a terminal transmits data or a control signal to a base station in a communication system using a licensed frequency band.
Figure 2:
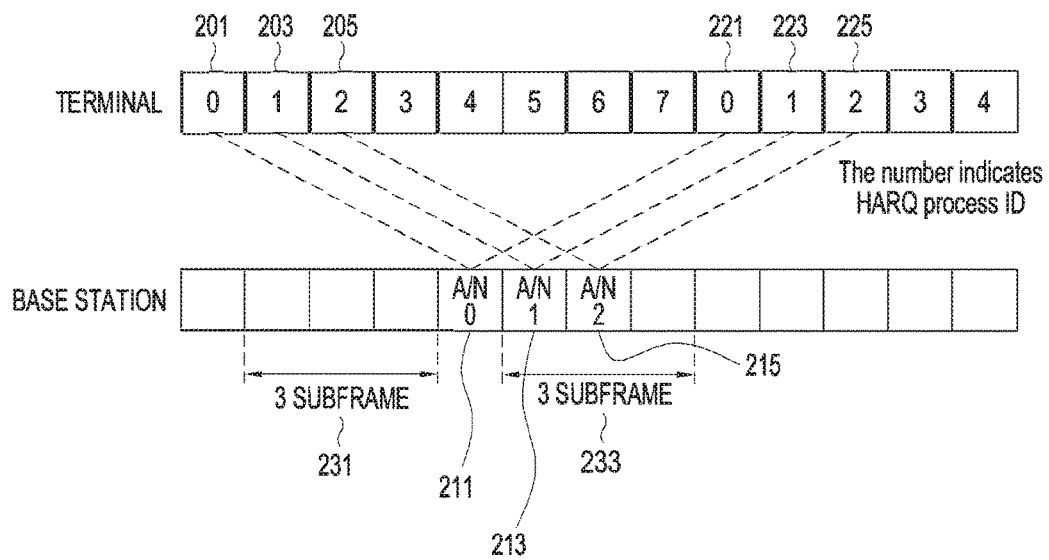
FIG. 2 is a diagram showing an example of exchange of data and an ACK/NACK signal between a base station and a terminal that use a synchronous HARQ scheme.
Figure 3A:
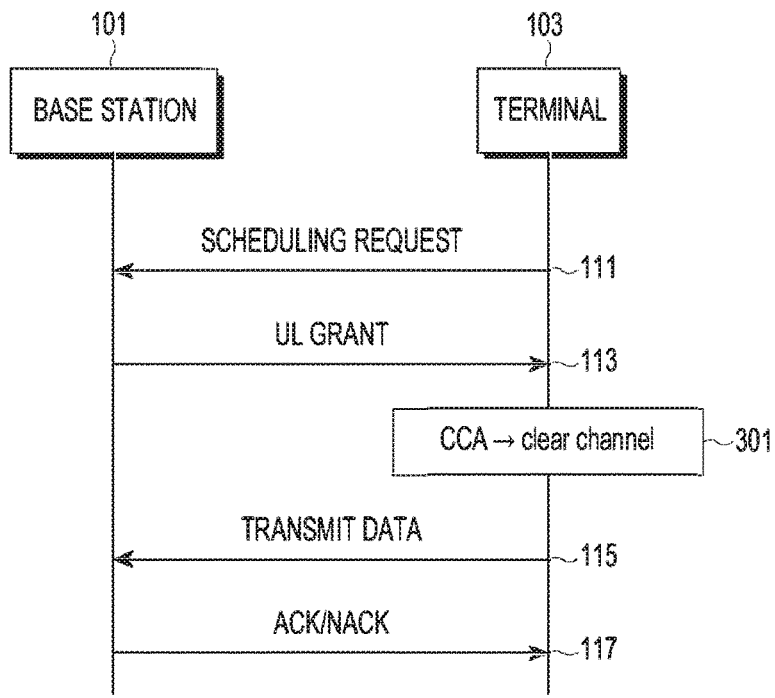
FIG. 3 is a flowchart showing transmission and reception of data or a control signal between a terminal and a base station that use a synchronous HARQ scheme in an unlicensed frequency band.
Figure 3B:
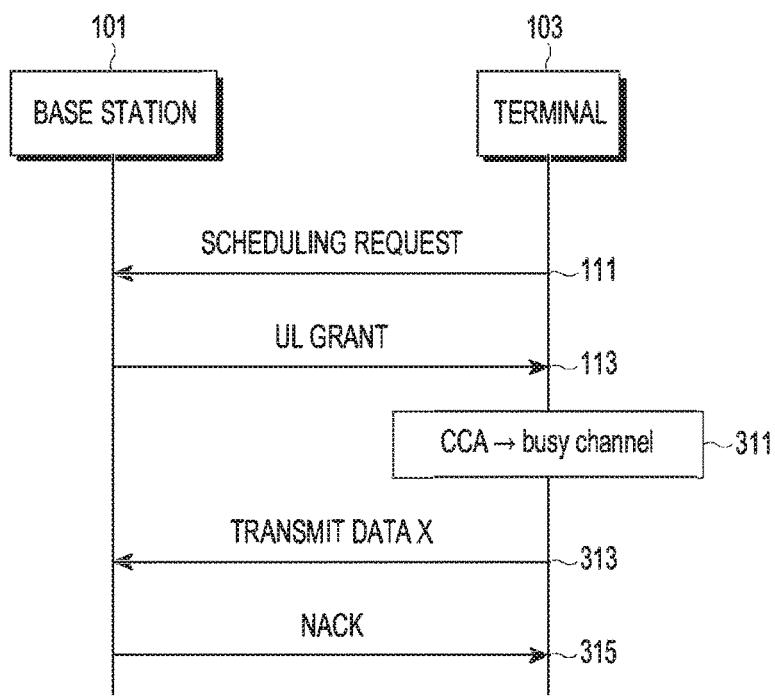

Hereinafter, embodiments of the present disclosure will be described in detail with reference to the accompanying drawings. Moreover, a detailed description of well-known functions or elements associated with the present disclosure will be omitted if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

Hereinbelow, a base station is an entity that performs resource allocation, and may be at least one of evolved NodeB (eNodeB), Node B, a base station (BS), a radio access unit, a base station controller, and a node on a network. A terminal may include a user equipment (UE), a mobile station (MS), a cellular phone, a smart phone, a computer, a multimedia system capable of performing a communication function, etc.

To solve a problem occurring when a synchronous hybrid automatic repeat request (HARQ) scheme is applied in an unlicensed frequency band, an asynchronous HARQ scheme capable of flexibly determining a point in time to transmit data, etc. is proposed. When the asynchronous HARQ scheme is applied in the unlicensed frequency band, the base station may freely schedule a point in time when the terminal is to transmit data for an uplink (UL) and a point in time when the base station is to transmit data for a downlink (DL), by using a physical downlink control channel (PDCCH) (or an enhanced PDCCH (ePDCCH)).

When the present disclosure is applied to a carrier aggregation (CA) system, a cell operating in a licensed frequency band may transmit necessary information to the terminal that operates in the unlicensed frequency band. For example, in a CA system where a primary cell (PCell) operates in a licensed frequency band and a secondary cell (SCell) operates in an unlicensed frequency band, resource allocation information allocated by the SCell to the terminal is transmitted to the terminal by the PCell or the SCell. The present disclosure is also applicable when the PCell transmits the resource allocation information.

Hereinbelow, a description will be made of a case where the asynchronous HARQ scheme is applied to an UL in an unlicensed frequency band proposed in the present disclosure. However, a method proposed in the present disclosure is applicable to a DL as well as an UL. A method proposed in the present disclosure has been proposed to solve a problem occurring in the asynchronous HARQ scheme, but the method is also applicable to a synchronous HARQ scheme.

When a terminal sends a scheduling request to a base station, the base station may send a scheduling grant or reject to the terminal, but hereinbelow, a description will be made of only a case where the base station grants scheduling to the terminal. In this case, the base station may notify the terminal of the scheduling grant, for example, by sending an UL grant signal to the terminal.

Figure 4:
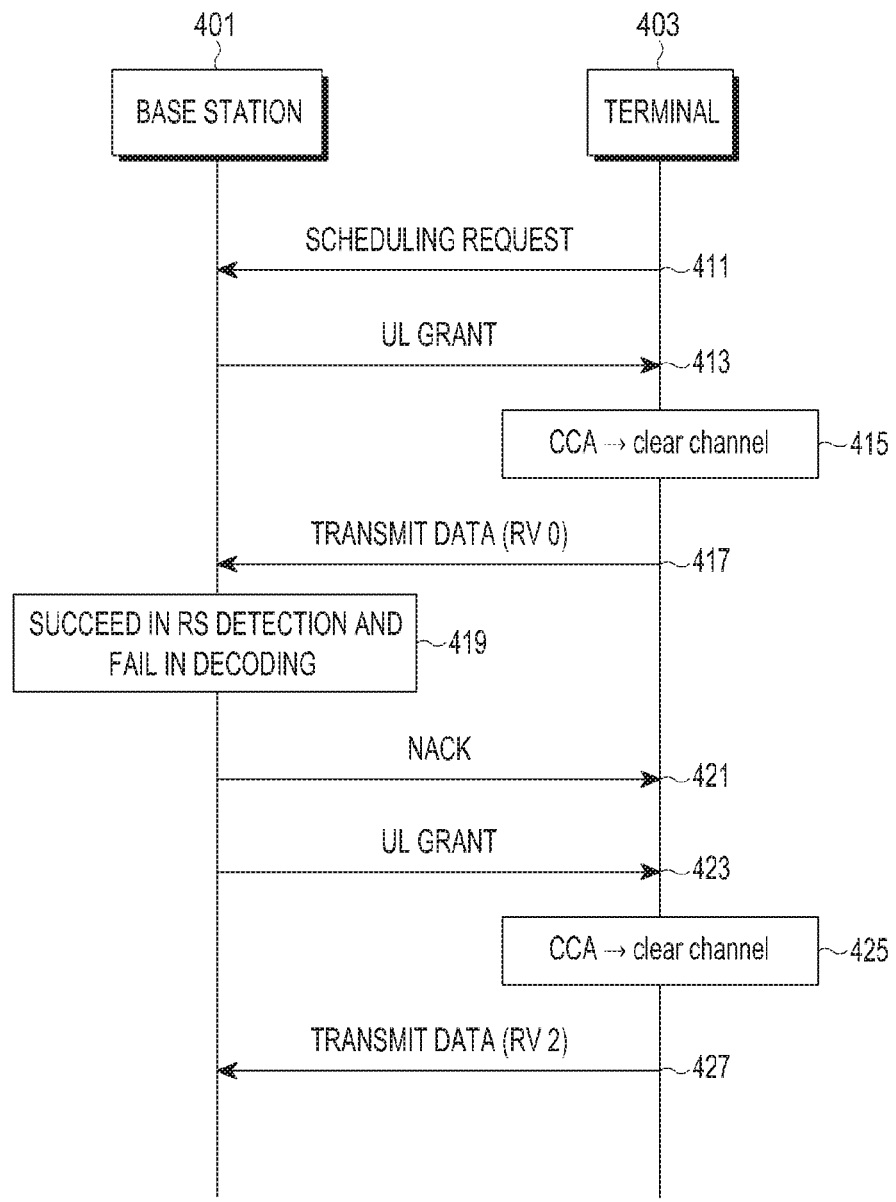
FIG. 4 is a flowchart showing an example of transmission and reception of data or a control signal between a terminal and a base station that use an asynchronous HARQ scheme in an unlicensed frequency band.

FIG. 4 is a flowchart showing an example of transmission and reception of data or a control signal between a terminal and a base station that use an asynchronous HARQ scheme in an unlicensed frequency band.

More specifically, FIG. 4 is a flowchart of a case where the base station detects a reference signal (RS) because any device does not use the unlicensed frequency band when the terminal uses the unlicensed frequency band, but the base station fails in decoding.

Although the RS signal is used as an example for description in FIG. 4, various signals such as a demodulation reference signal (DM-RS), a cell specific reference signal (CRS), etc., may be used.

A terminal 403 sends a scheduling request to a base station 401 in operation 411.

After performing scheduling in response to the scheduling request of the terminal 403, the base station 401 transmits a scheduling result (e.g., an UL grant) to the terminal 403 by using a DCI transmitted through a PDCCH, in operation 413. The scheduling result may include resource information allocated due to the grant of scheduling.

The terminal 403 performs clear channel assessment (CCA) at an allocated point in time. The terminal 403 detects (or senses) a clear state of the unlicensed frequency band (i.e., a clear channel) in operation 415.

The terminal 403 transmits data because the unlicensed frequency band is in the clear state, in operation 417. Since the terminal 403 transmits the data for the first time, the terminal 403 sets an HARQ redundancy version (HARQ RV) to 0 when transmitting the data. Thereafter, when the terminal 403 re-transmits the data, the terminal 403 sets the HARQ RV sequentially to 2, 3, and 1 before the re-transmission. The HARQ RV indicates information about information included in the re-transmitted data.

The base station 401 detects the RS and measures energy of the RS to determine whether the terminal 403 has transmitted the data. For example, if the energy (or power) of the RS is equal to or less than a predetermined value (or a reference value), the base station 401 may determine that the terminal 403 has not transmitted the data. In FIG. 4, the base station 401 fails in decoding in spite of detecting the RS, in operation 419. The base station 401 may fail in decoding due to low channel gain, noise and interference signal, etc. For reference, if the base station 401 detects the RS and succeeds in decoding, any problem may not occur.

The base station 401 sends a NACK signal to the terminal 403 because of failing in decoding, in operation 421.

In addition, since the base station 401 sends a NACK signal to the terminal 403, the base station 401 performs scheduling again to enable the terminal 403 to re-transmit the data and transmits a scheduling result (UL grant) to the terminal 403 using a DCI transmitted through a PDCCH, in operation 423. Selectively, the base station 401 may transmit a new data indicator (NDI), which indicates that data to be transmitted by the terminal 403 is new data, to the terminal 403 through the UL grant 413 or 423. The NDI is an indicator indicating to the terminal 403 by the base station 401 whether the terminal 403 has to transmit the new data. More specifically, the base station 401 transmits the NDI through the UL grant 413 in response to the scheduling request 411 and, and if transmitting the NDI through the UL grant 423 after sending the NACK signal 421, the base station 401 determines an NDI value of the UL grant 413 as an NDI value of the UL grant 423. That is, since the base station 401 fails in decoding, the base station 401 transmits the NDI (i.e., the NDI value of the UL grant 413) without changing the NDI value of the UL grant 413 to indicate, to the terminal 403, re-transmission of previously transmitted data instead of new data.

In regard to priorities of information transmitted through the NACK signal and the UL grant signal, a priority of the UL grant signal may be higher than that of the NACK signal. For example, if an NDI value in an UL grant signal is changed to indicate new data transmission, the terminal 403 transmits new data even if receiving a NACK signal.

The terminal 403 performs CCA at an allocated point in time because of having received the UL grant signal. The terminal 403 detects the clear state of the unlicensed frequency band in operation 425.

In operation 427, the terminal 403 re-transmits the data because of having received the NACK signal in operation 421. Since the terminal 403 transmits the data for the second time, the terminal 403 sets an HARQ RV to 2 when transmitting the data.

The example of FIG. 4 corresponds to a case where the terminal 403 and the base station 401 may predict their operations because of performing the operations as requested.

Although an UL is described as an example in FIG. 4, the present disclosure is also applicable to a DL as long as the base station 401 allocates a resource to the terminal 403 and transmits data to the terminal 403 at an allocated point in time. The following other examples may also be applied to the DL.

Figure 5:
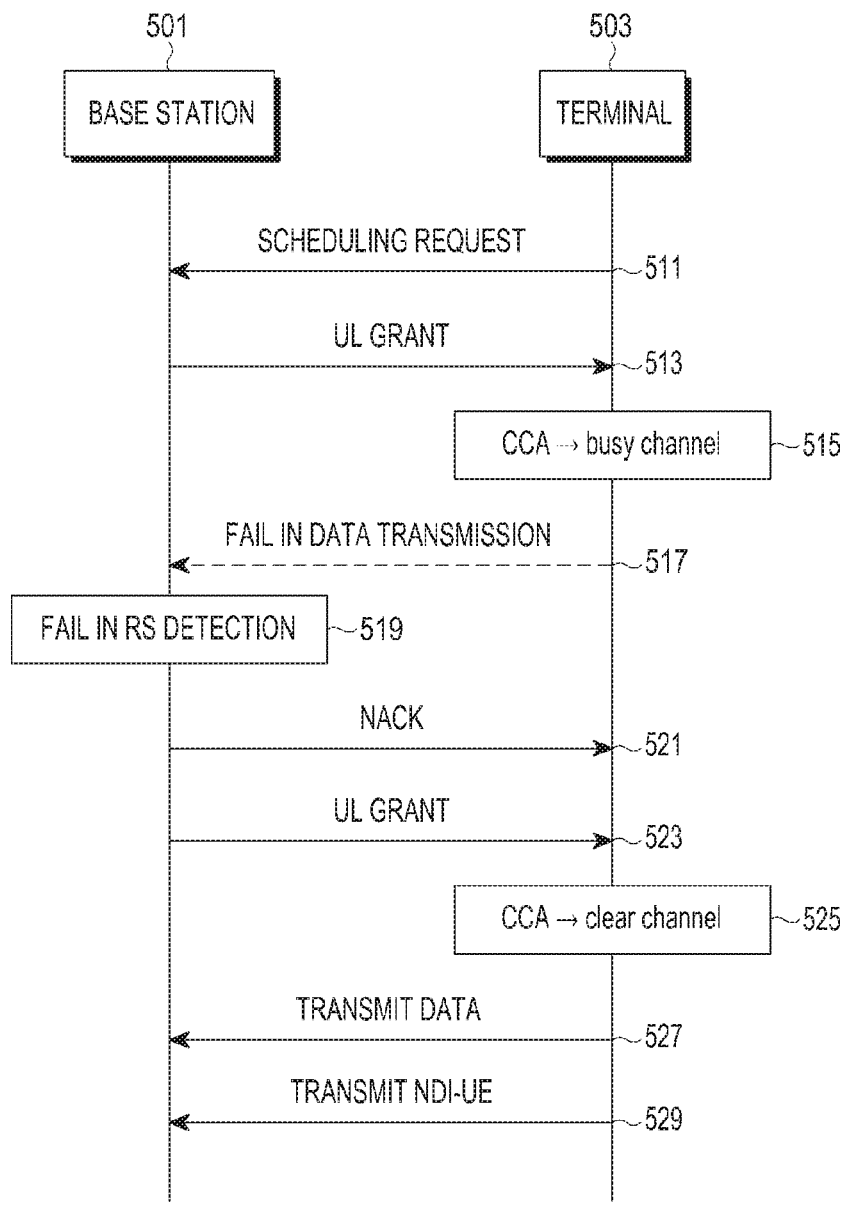
FIG. 5 is a flowchart showing another example of transmission and reception of data or a control signal between a terminal and a base station that use an asynchronous HARQ scheme in an unlicensed frequency band.

FIG. 5 is a flowchart showing an example of transmission and reception of data or a control signal between a terminal and a base station that use an asynchronous HARQ scheme in an unlicensed frequency band.

More specifically, FIG. 5 is a flowchart of a case where the base station fails in detecting an RS because another device is already using the unlicensed frequency band when the terminal is to use the unlicensed frequency band.

A terminal 503 sends a scheduling request to a base station 501 in operation 511.

After performing scheduling in response to the scheduling request of the terminal 503, the base station 501 transmits a scheduling result (e.g., an UL grant) to the terminal 503 by using a DCI transmitted through a PDCCH, in operation 513.

The terminal 503 performs CCA at an allocated point in time. Unlike in the example of FIG. 4, the terminal 503 detects a busy state of the unlicensed frequency band (i.e., a busy channel) in operation 515.

The terminal 503 fails to transmit data because the unlicensed frequency band is in the busy state, in operation 517.

In operation 519, the base station 501 attempts to detect the RS, but fails in detecting the RS, because of not knowing whether the terminal 503 has transmitted data. The base station 501 may assume two reasons for a failure in detection of the RS because of not knowing an operation performed by the terminal 503. The first one is that the base station 501 assumes that the terminal 503 does not transmit data because of a bad state of the unlicensed frequency band. The second one is that although the terminal 503 transmits data, the base station 501 is assumed to fail to detect the RS due to other reasons such as a low channel gain, interference, noise, and so forth.

Despite the two assumptions, the base station 501 sends a NACK signal to the terminal 503 because of failing to detect the RS, in operation 521.

In addition, since the base station 501 sends a NACK signal to the terminal 503, the base station 401 performs scheduling again to enable the terminal 503 to re-transmit the data and transmits an UL grant to the terminal 503 using a DCI transmitted through a PDCCH, in operation 523. Like in FIG. 4, the base station 501 may transmit an NDI through something. On the first assumption, the base station 501 transmits the NDI after changing a value of the NDI. However, on the second assumption, the base station 501 transmits the NDI without changing the value of the NDI. Although the NDI is described as being transmitted only in operation 523, the NDI may also be transmitted in operation 513.

In regard to priorities of information transmitted through the NACK signal and the UL grant signal, a priority of the UL grant signal may be higher than that of the NACK signal. For example, if an NDI value in an UL grant signal is changed to indicate new data transmission, the terminal 503 transmits new data even if receiving a NACK signal.

The terminal 503 performs CCA at an allocated point in time because of having received the UL grant signal. The terminal 503 detects the clear state of the unlicensed frequency band in operation 525.

The terminal 503 transmits the data based on the NDI in operation 527. A problem is that a set value of the HARQ RV by the terminal 503 varies with an assumption of the base station 501. That is, on the first assumption, the terminal 503 sets the HARQ RV to 0. However, on the second assumption, the terminal 503 sets the HARQ RV to 2. In this case, since determining that all the data having a state where the HARQ RV is set to 0 is lost, the base station 501 performs an automatic repeat request (ARQ) scheme instead of the HARQ scheme because there is no previous data. It is already known that data recovery based on the ARQ scheme takes a longer time than data recovery based on the HARQ scheme.

The terminal 503 performs the following operations to solve problems occurring according to the two assumptions. More specifically, the terminal 503 determines whether three conditions described below are satisfied. First, the terminal 503 determines whether data has not been transmitted because of detecting the busy state of the unlicensed frequency band (i.e., a busy channel) as a result of performing CCA after operation 513 of receiving an UL grant, before operation 523 of receiving a current UL grant. Second, the terminal 503 determines whether a value of the NDI is not changed in operation 513 of receiving the UL grant, before operation 523 of receiving the current UL grant. Third, the terminal 503 determines whether the unlicensed frequency band is in the clear state (i.e., a clear channel) as a result of performing CCA after operation 523 of receiving the current UL grant. If all the three conditions are satisfied, the terminal 503 transmits a new indicator, a new data indicator from user equipment (NDI-UE), in operation 529. The terminal 503 may indicate through the NDI-UE indicator that data to be transmitted is new data.

Thus, in operation 527, the terminal 503 sets the HARQ RV to 0 regardless of the two assumptions.

Figure 6:
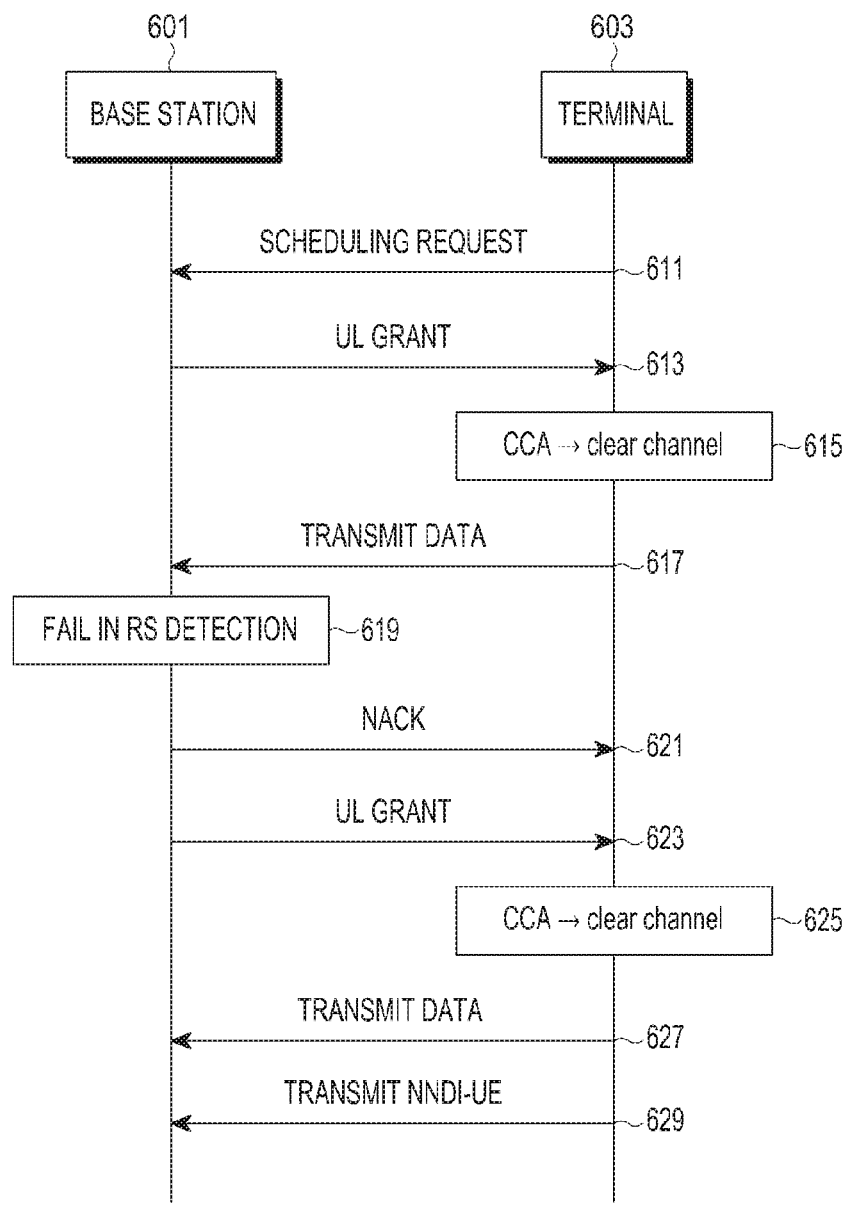
FIG. 6 is a flowchart showing another example of transmission and reception of data or a control signal between a terminal and a base station that use an asynchronous HARQ scheme in an unlicensed frequency band.

FIG. 6 is a flowchart showing another example of transmission and reception of data or a control signal between a terminal and a base station that use an asynchronous HARQ scheme in an unlicensed frequency band.

More specifically, FIG. 6 is a flowchart of a case where the base station fails in detecting an RS although any device is not using the unlicensed frequency band when the terminal is to use the unlicensed frequency band.

A terminal 603 sends a scheduling request to a base station 601 in operation 611.

After performing scheduling in response to the scheduling request of the terminal 603, the base station 601 transmits a scheduling result (e.g., an UL grant) to the terminal 603 by using a DCI transmitted through a PDCCH, in operation 613.

The terminal 603 performs CCA at an allocated point in time. Like in the example of FIG. 4, the terminal 603 detects a clear state of the unlicensed frequency band (i.e., a clear channel) in operation 615.

The terminal 603 transmits data because the unlicensed frequency band is in the clear state, in operation 617. Since the terminal 603 transmits the data for the first time, the terminal 603 sets an HARQ RV to 0 when transmitting the data.

The base station 601 detects the RS and measures energy of the RS to determine whether the terminal 603 has transmitted the data. Unlike in the example of FIG. 4, the base station 601 may fail to detect the RS for several reasons such as a low channel gain, noise, interference, and so forth, in operation 619. The base station 601 may not perform decoding because of failing to detect the RS in operation 619. Selectively, the base station 601 may fail in decoding even if performing the decoding. Like in the example of FIG. 5, the base station 601 may assume two reasons for a failure in detection of the RS because of not knowing an operation performed by the terminal 603. The first one is that the base station 601 assumes that the terminal 603 does not transmit data because of a bad state of the unlicensed frequency band. The second one is that although the terminal 603 transmits data, the base station 601 is assumed to fail to detect the RS due to other reasons such as a low channel gain, interference, noise, and so forth.

Despite the two assumptions, the base station 601 sends a NACK signal to the terminal 603 because of failing to detect the RS, in operation 621.

In addition, since the base station 601 sends a NACK signal to the terminal 603, the base station 401 performs scheduling again to enable the terminal 603 to re-transmit the data and transmits a scheduling result (UL grant) to the terminal 603 using a DCI transmitted through a PDCCH, in operation 623. Like in FIG. 5, the base station 601 may transmit an NDI after changing a value of the NDI. On the first assumption, the base station 601 transmits the NDI after changing a value of the NDI. However, on the second assumption, the base station 601 transmits the NDI without changing the value of the NDI. Although the NDI is described as being transmitted only in operation 623, the NDI may also be transmitted in operation 613.

Regarding priorities of information transmitted through the NACK signal and the UL grant signal, a priority of the UL grant signal may be higher than that of the NACK signal. For example, if an NDI value in an UL grant signal is changed to indicate new data transmission, the terminal 603 transmits new data even if receiving a NACK signal.

The terminal 603 performs CCA at an allocated point in time because of having received the UL grant signal. The terminal 603 detects the clear state of the unlicensed frequency band in operation 625.

The terminal 603 transmits the data based on the NDI in operation 627 Like in the example of FIG. 5, a problem occurs because the terminal 604 does not know what assumption the base station 601 has made. That is, the terminal 603 sets a value of the HARQ RV differently depending on an assumption of the base station 601, when transmitting the data. More specifically, if determining that the base station 601 has made the first assumption, the terminal 603 sets the HARQ RV value to 0. However, if determining that the base station 601 has made the second assumption, the terminal 603 sets the HARQ RV value to 2. In this case, since determining that all the data having a state where the HARQ RV is set to 0 is lost, the base station 601 performs the ARQ scheme instead of the HARQ scheme, causing a problem.

The terminal 603 performs the following operations to solve problems occurring according to the two assumptions. More specifically, the terminal 603 determines whether three conditions described below are satisfied. First, the terminal 603 has transmitted data because of detecting the clear state of the unlicensed frequency band (i.e., the clear channel) as a result of performing CCA after operation 613 of receiving an UL grant, before operation 623 of receiving a current UL grant, but the terminal 603 determines whether a NACK signal has been received from the base station 601 with respect to the data transmission. Second, the terminal 603 determines whether a value of the NDI is changed in operation 613 of receiving the UL grant, before operation 623 of receiving the current UL grant. Third, the terminal 603 determines whether the unlicensed frequency band is in the clear state (i.e., the clear channel) as a result of performing CCA after operation 623 of receiving the current UL grant. If all the three conditions are satisfied, the terminal 603 transmits a new indicator, a not-new data indicator from user equipment (NNDI-UE), in operation 629. The terminal 603 may indicate through the NNDI-UE indicator that data to be transmitted is not new data. Alternatively, if all the three conditions are satisfied, the terminal 603 may transmit data without indicating the new indicator NDI-UE.

In operation 627, the terminal 603 sets the HARQ RV to 0 regardless of the two assumptions.

FIGS. 7A and 7B are examples where a terminal simultaneously transmits an indicator and data to a base station.

The indicator may be the NDI-UE indicator or the NNDI-UE indicator described with reference to FIGS. 4 through 6.

The terminal may also transmit the indicator by multiplexing while transmitting data through a physical uplink shared channel (PUSCH) at a point in time allocated by the base station through an UL grant.

FIG. 7A shows an example where the indicator is positioned vertically beside a rank indicator (RI). When ACK/NACK, a channel quality indicator (CQI), a precoding matrix indicator (PMI), an uplink control indicator (UCI) such as an RI, and so forth are multiplexed in the PUSCH, the terminal may transmit the indicator to the base station by making a rule like ACK/NACK beside an RS, an RI beside the ACK/NACK, the indicator beside the RI, and so forth.

FIG. 7B shows an example in which the indicator is positioned horizontally after allocation of a CQI is finished.

Figure 8:
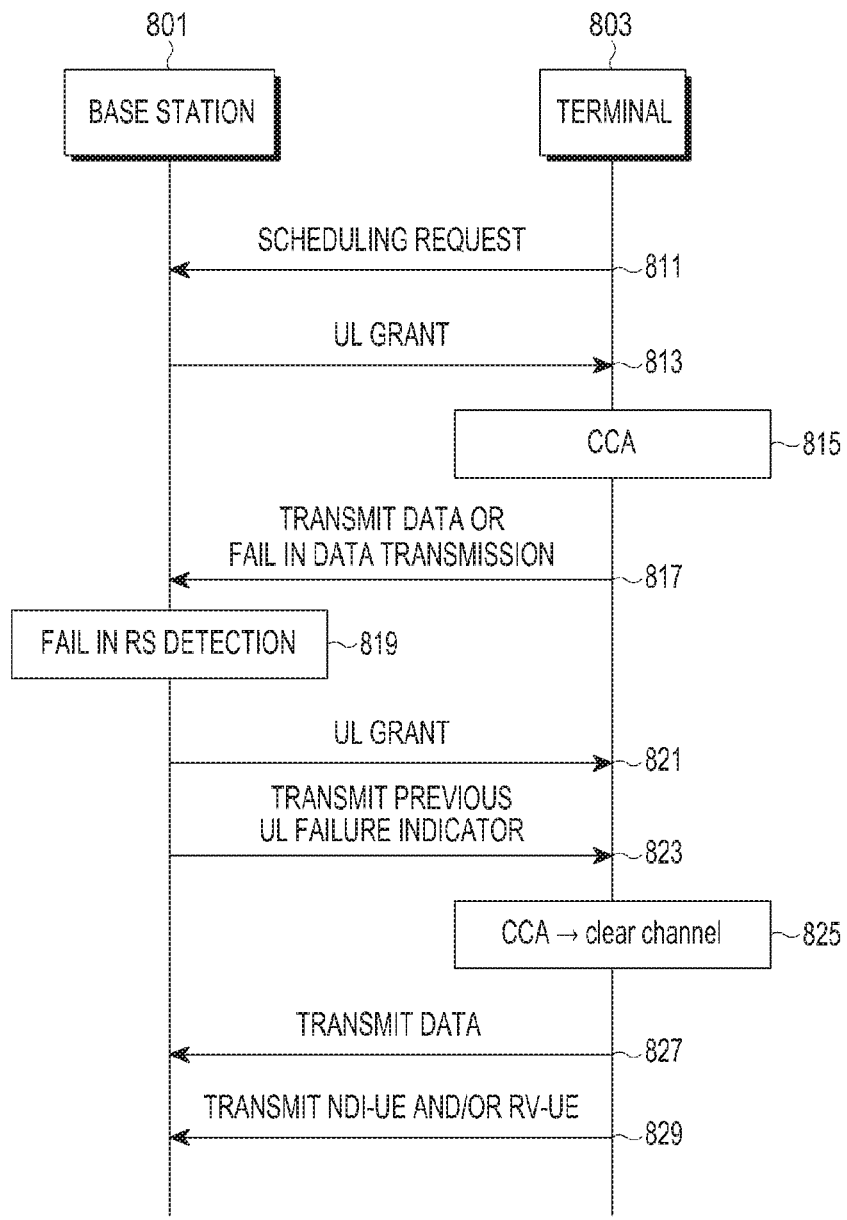
FIG. 8 is a flowchart showing another example of transmission and reception of data or a control signal between a terminal and a base station that use an asynchronous HARQ scheme in an unlicensed frequency band.

FIG. 8 is a flowchart showing another example of transmission and reception of data or a control signal between a terminal and a base station that use an asynchronous HARQ scheme in an unlicensed frequency band.

The example shown in FIG. 8 is applicable regardless of the assumptions in FIG. 5 or 6.

A terminal 803 sends a scheduling request to a base station 801 in operation 811.

After performing scheduling in response to the scheduling request of the terminal 803, the base station 801 transmits a scheduling result (e.g., an UL grant) to the terminal 803 by using a DCI transmitted through a PDCCH, in operation 813.

The terminal 803 performs CCA at an allocated point in time in operation 815.

The terminal 803 may not transmit data if the unlicensed frequency band is busy (i.e., the busy channel), whereas if the unlicensed frequency band is clear (i.e., the clear channel), the terminal 803 transmits the data in operation 817.

In operation 819, the base station 801 attempts to detect the RS, but fails in detecting the RS, because of not knowing whether the terminal 503 has transmitted data. The base station 801 may not perform decoding because of failing to detect the RS in operation 819. The base station 801 sends a NACK signal to the terminal 803. As shown in the example of FIG. 5 and the example of FIG. 6, the base station 801 may assume two reasons for a failure in detection of the RS because of not knowing an operation performed by the terminal 803.

In addition, since the base station 801 sends a NACK signal to the terminal 803, the base station 801 performs scheduling again to enable the terminal 803 to re-transmit the data and transmits a scheduling result (UL grant) to the terminal 803 using a DCI transmitted through a PDCCH, in operation 821.

When transmitting the UL grant, the base station 801 determines whether conditions described below are satisfied and transmits a previous UL failure indicator through the UL grant in operation 823.

More specifically, although in operation 813 of transmitting the UL grant before operation 821 of transmitting the current UL grant, indicating to the terminal 803 that scheduling is successfully performed, the base station 801 may fail to detect the RS. Alternatively, although transmitting the UL grant in operation 813 before operation 821 of transmitting the current UL grant, the base station 801 may fail to detect the RS because the terminal 803 fails in receiving the previous UL grant and thus does not transmit data. The base station 801 may transmit the previous UL failure indicator indicating the failure in detecting the RS, through the UL grant. That is, if the base station 801 transmits the previous UL failure indicator, it means that the base station 801 does not know whether new data needs to be requested or previous data needs to be requested, and does not know a set value of the HARQ RV if the previous data needs to be requested.

The terminal 803 performs CCA at an allocated point in time because of having received the UL grant signal. The terminal 803 detects the clear state of the unlicensed frequency band in operation 825.

The terminal 803 transmits the data based on the previous UL failure indicator in operation 827.

The terminal 803 also transmits information about the data, e.g., an NDI-UE and/or a redundancy version—user equipment (RV-UE), together, in operation 829. That is, the terminal 803 transmits the NDI-UE after changing a value of the NDI-UE if the data in operation 827 is new data, and transmits the NDI-UE without changing the value of the NDI-UE if the data is previous data. Alternatively, if the terminal 803 uses the NNDI-UE, the terminal 803 may transmit the NNDI-UE in a manner reverse to the case with the NDI-UE. However, if the data in operation 827 is previous data, the terminal 803 may also transmit information about an RV by using the RV-UE. The terminal 803 may also transmit a CCA result (i.e., the clear channel or the busy channel), an HARQ process ID for the data transmitted by the terminal 803, a DM-RS sequence, shift information, and so forth through the NDI-UE and/or the RV-UE.

Figure 9:
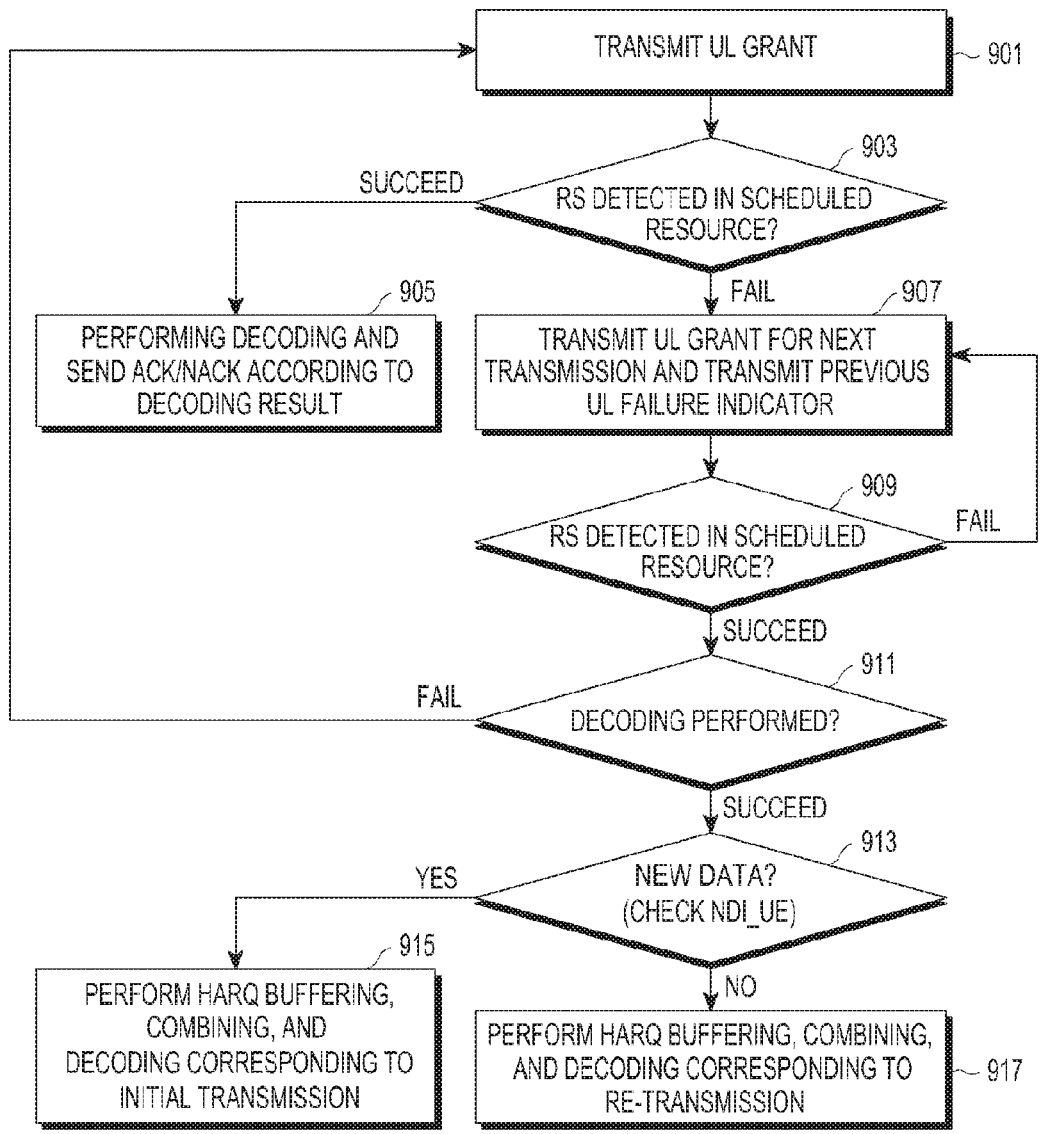
FIG. 9 is a flowchart showing operations of a base station according to examples of FIGS. 4 through 6 and FIG. 8.

FIG. 9 is a flowchart showing operations of the base station according to the examples of FIGS. 4 through 6 and FIG. 8.

The base station performs scheduling in response to a scheduling request of a terminal and transmits an UL grant to the terminal using a DCI transmitted through a PDCCH in operation 901.

The base station attempts detection of an RS at a point in time based on the scheduling in operation 903.

Once the base station succeeds in detecting the RS, the base station performs decoding and transmits a decoding result to the terminal through an ACK or NACK signal in operation 905.

If the base station fails in detecting the RS, the base station performs scheduling again because of expecting re-transmission of data from the terminal, and transmits a scheduling result (UL grant) to the terminal using a DCI transmitted through a PDCCH in operation 907. Selectively, the base station may also transmit a previous UL failure indicator through the UL grant.

The base station attempts detection of an RS at a point in time based on the scheduling in operation 909.

The base station performs again operation 907 if failing to detect the RS. However, if succeeding in detecting the RS, the base station performs decoding in operation 911.

The base station performs again operation 901 if failing in the decoding. However, if succeeding in the decoding, the base station checks an NDI-UE indicator transmitted by the terminal in operation 913. That is, the base station determines whether the data transmitted by the terminal using the NDI-UE indicator is new data.

If the data transmitted by the terminal is new data, the base station performs HARQ buffering, combining, and decoding corresponding to initial transmission in operation 915.

However, if the data transmitted by the terminal is not new data, the base station performs HARQ buffering, combining, and decoding corresponding to re-transmission in operation 917.

Figure 10:
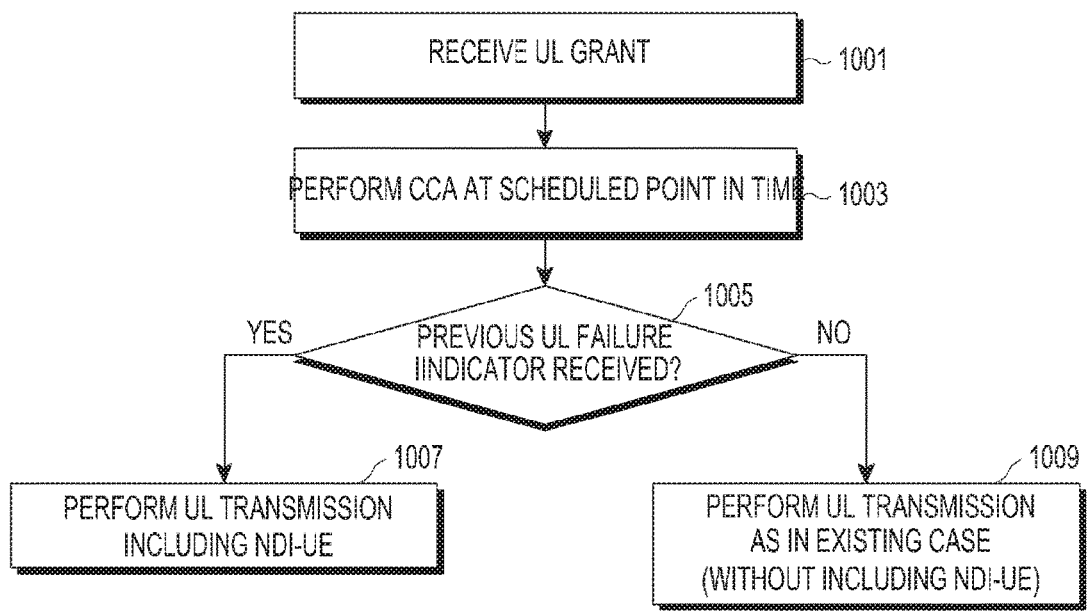
FIG. 10 is a flowchart showing operations of a terminal according to an example of FIG. 8.

FIG. 10 is a flowchart showing operations of the terminal according to the example of FIG. 8.

The terminal receives an UL grant from the base station in operation 1001.

The terminal performs CCA at a point in time scheduled by the base station in operation 1003.

The terminal checks a previous UL failure indicator received from the base station in operation 1005.

If the previous UL failure indicator is indicated, the terminal also transmits information about the transmission data through the transmission data in operation 1007. The information about the transmission data may include information about whether the transmission data is previously transmitted data, information about the number of re-transmissions before the current re-transmission if the transmission data is previously transmitted data, and so forth.

If the previous UL failure indicator is not indicated, the terminal transmits only the data without including the information about the transmission data in operation 1009.

Figure 11:
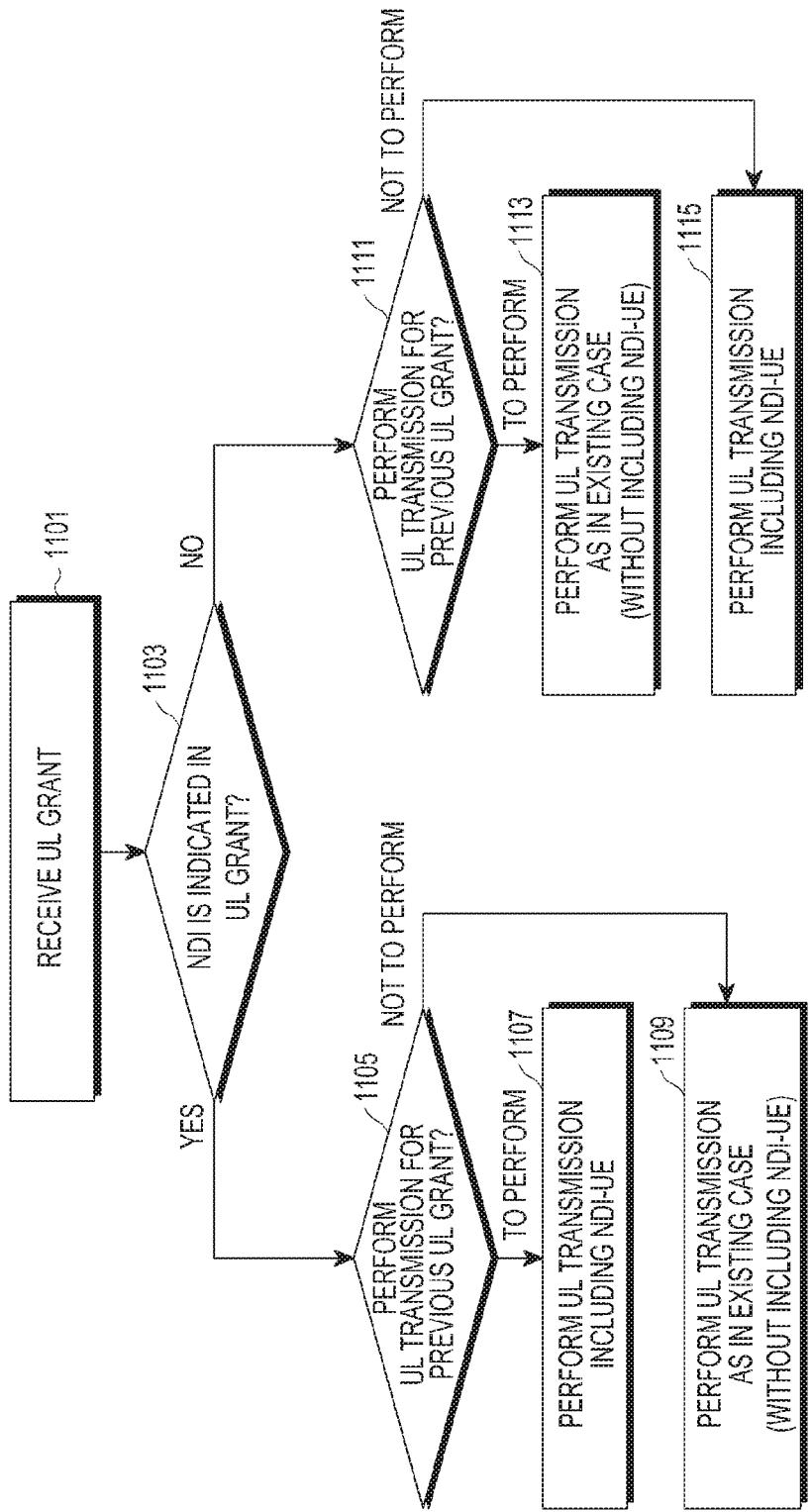
FIG. 11 is a flowchart showing operations of a terminal according to examples of FIGS. 4 through 6.

FIG. 11 is a flowchart showing operations of the terminal according to the examples of FIGS. 4 through 6.

The terminal receives an UL grant from the base station in operation 1101.

The terminal checks an NDI in the UL grant in operation 1103.

If a value of the NDI has been changed, the terminal determines whether to transmit data corresponding to a previous UL grant previous to operation 1101, in operation 1105.

Once determining to transmit the data corresponding to the previous UL grant, the terminal transmits an NDI-UE indicator through the data in operation 1107.

However, if determining not to transmit the data corresponding to the previous UL grant, the terminal transmits the data without including the NDI-UE indicator in operation 1109.

If the value of the NDI has not been changed, the terminal determines whether to transmit the data corresponding to the previous UL grant in operation 1111.

If determining to transmit the data corresponding to the previous UL grant, the terminal transmits the data without including the NDI-UE indicator in operation 1113.

However, if determining not to transmit the data corresponding to the previous UL grant, the terminal transmits the NDI-UE indicator through the data in operation 1115.

The above examples concern scheduling of one subframe when the base station performs scheduling for the terminal. Those of ordinary skill in the art may easily apply the above examples to scheduling of multiple subframes by the base station, but to help understanding, the following description will be made of a case where the base station schedules the multiple subframes for the terminal.

Figure 12:
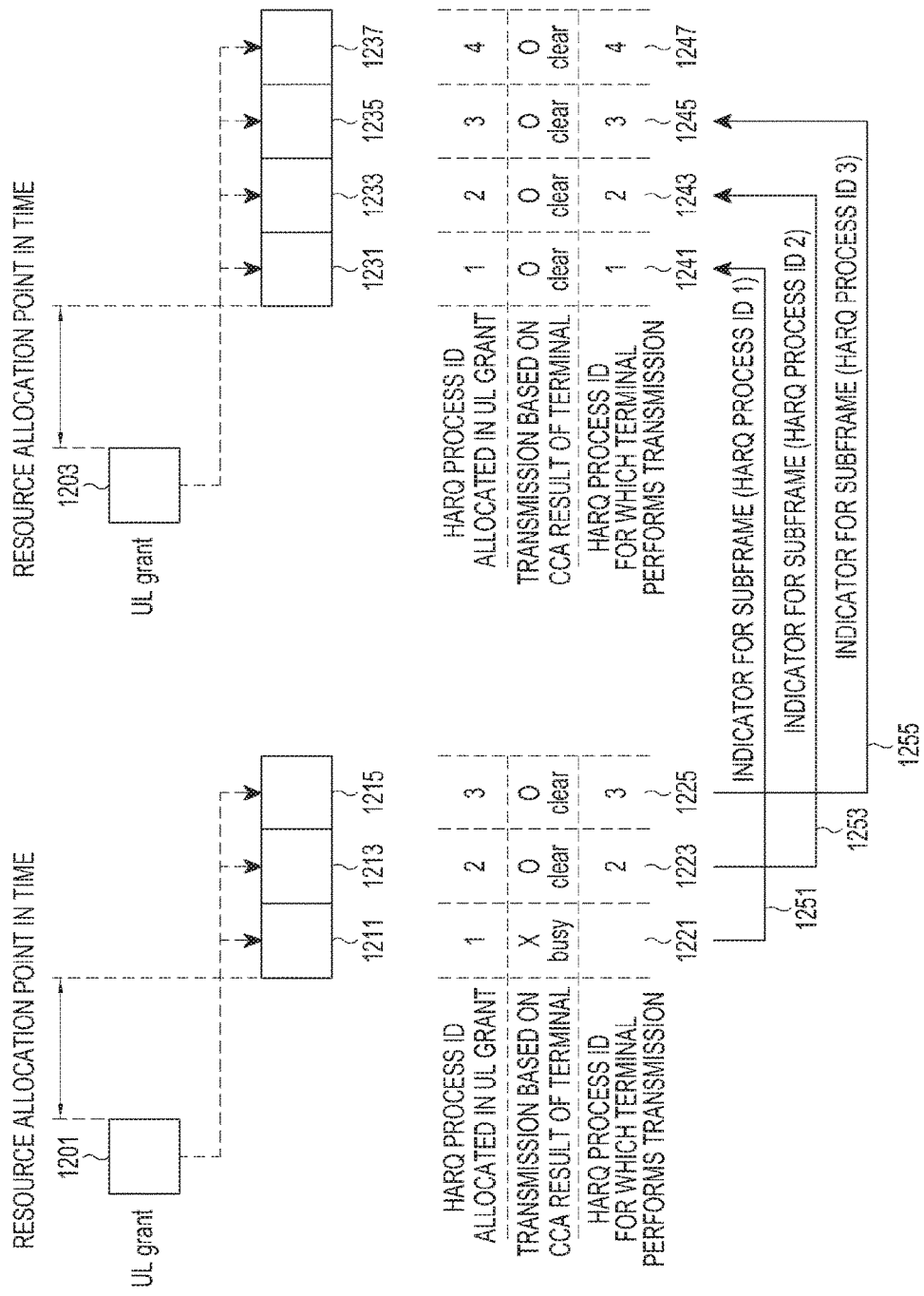
FIG. 12 is a diagram showing an embodiment where a base station schedules multiple subframes for a terminal when the terminal and the base station use an asynchronous HARQ scheme in an unlicensed frequency band.

FIG. 12 is a diagram showing an embodiment where a base station schedules multiple subframes for a terminal when the terminal and the base station use an asynchronous HARQ scheme in an unlicensed frequency band.

Referring to FIG. 12, the base station schedules three subframes 1211, 1213, and 1215 in a first UL grant 1201 and schedules four subframes 1231, 1233, 1235, and 1237 in a second UL grant 1203. An HARQ process ID allocated to each subframe using in a corresponding UL grant is shown in FIG. 12. Whether data is transmitted based on a result of CCA performed by the terminal in a corresponding subframe is also shown in FIG. 12.

Referring to FIG. 12, the terminal detects a busy channel as a result of CCA performed in a first subframe 1211 among the three subframes scheduled in the first UL grant 1201, and thus fails in transmitting data corresponding to HARQ process ID 1 as indicated in 1221.

However, the terminal detects a clear channel as a result of CCA performed in second and third subframes 1213 and 1215 among the three subframes scheduled in the first UL grant 1201, and thus transmits data corresponding to HARQ process ID 2 and HARQ process ID 3 as indicated in 1223 and 1225.

To solve a problem occurring because the base station does not know a result of CCA performed by the terminal and whether the terminal transmits data, the terminal transmits an indicator NDI or NNDI to the base station. However, since the base station has scheduled multiple subframes for the terminal by using one UL grant, a definition of when the terminal has to transmit the NDI or the NNDI is needed.

According to the current embodiment, the terminal operates based on principles described below. Once the terminal is allocated with a subframe for transmitting data corresponding to an HARQ process ID N in an UL grant, the terminal performs CCA in the subframe. An indicator indicating a result of the CCA is transmitted in a first subframe for transmitting data corresponding to the HARQ process ID N after the UL grant.

In FIG. 12, although the terminal is allocated with the subframe 1211 for transmitting data corresponding to the HARQ process ID 1 in the UL grant 1201, the terminal detects a busy channel as a result of CCA and thus fails in transmitting the data. An indicator 1251 indicating the result of CCA is also transmitted as indicated in 1241, if the terminal is allocated with the subframe 1231 for transmitting the data corresponding to the HARQ process ID 1 in the next UL grant 1203 and detects a clear channel as the result of CCA.

Likewise, the terminal is allocated with the subframes 1213 and 1215 for transmitting data corresponding to the HARQ process ID 2 and data corresponding to the HARQ process ID 3 in the UL grant 1201 and detects a clear channel as a result of CCA, thus transmitting the data. Corresponding indicators 1253 and 1255 are also transmitted as indicated in 1243 and 1245, if the terminal is allocated with the subframes 1233 and 1235 for transmitting the data corresponding to the HARQ process ID 2 and the data corresponding to the HARQ process ID 3 in the next UL grant 1203 and detects a clear channel as the result of CCA, as indicated by 1243 and 1245.

While the description has been made of a case where the base station schedules multiple persistent subframes for the terminal with reference to FIG. 12, the description may also be applied to scheduling of multiple semi-persistent subframes.

Figure 13:
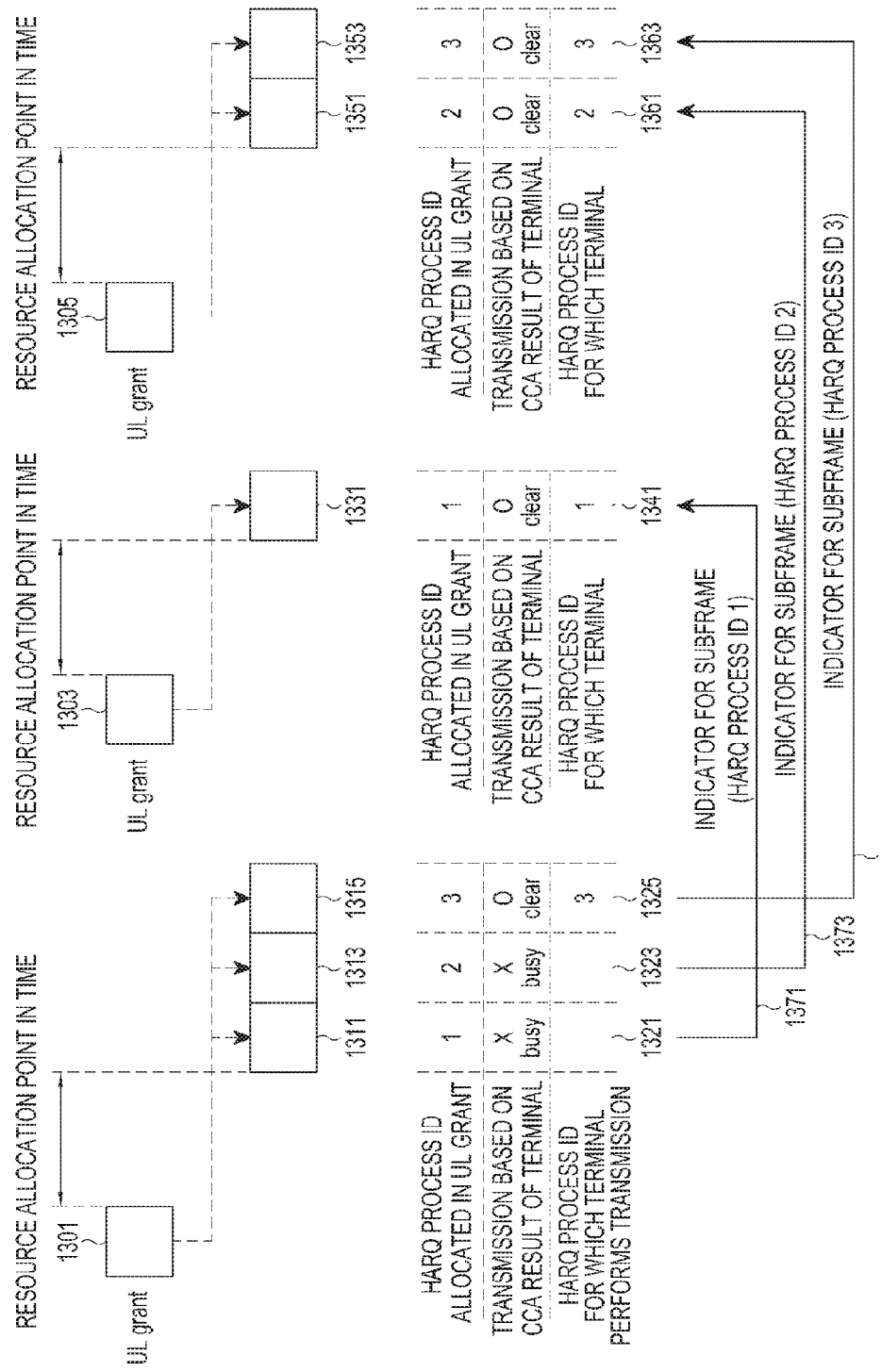
FIG. 13 is another diagram for describing a method proposed in FIG. 12.

FIG. 13 is another diagram for describing a method proposed in FIG. 12.

Referring to FIG. 13, for the terminal, the base station schedules three subframes 1311, 3, and 1315 in a first UL grant 1301, schedules one subframe 1331 in a second UL grant 1303, and schedules two subframes 1351 and 1353 in a third UL grant 1305.

Referring to FIG. 13, the terminal detects a busy channel as a result of CCA performed in a first subframe 1311 and a second subframe 1313 among the three subframes scheduled in the first UL grant 1301, and thus fails in transmitting data corresponding to HARQ process ID 1 and data corresponding to HARQ process ID 2 as indicated in 1321 and 1323.

However, the terminal detects a clear channel as a result of CCA performed in a third subframe 1315 among the three subframes scheduled in the first UL grant 1301, and thus transmits data corresponding to HARQ process ID 3 as indicated in 1325.

In the same manner as described with reference to FIG. 12, FIG. 13 works.

More specifically, although the terminal is allocated with the subframe 1311 for transmitting the data corresponding to the HARQ process ID 1 in the UL grant 1301, the terminal detects the busy channel as a result of CCA and thus fails in transmitting the data. An indicator 1371 indicating the result of CCA is also transmitted as indicated in 1341, if the terminal is allocated with the subframe 1331 for transmitting the data corresponding to the HARQ process ID 1 in the next UL grant 1303 and detects the clear channel as the result of CCA. However, since the base station schedules only one subframe in the UL grant 1303, the terminal may not transmit an indicator regarding RQ process ID 2 and an indicator regarding HARQ process ID 3.

In this case, the terminal transmits the indicator regarding HARQ process ID 2 and the indicator regarding HARQ process ID 3 in the next UL grant 1305 following the UL grant 1303. More specifically, the terminal is allocated with the two subframes 1313 and 1315 for transmitting the data corresponding to the HARQ process ID 2 and the data corresponding to the HARQ process ID 3 in the UL grant 1301, and detects the busy channel in one subframe 1313 and the clear channel in the other subframe 1315 as results of CCA, thus transmitting the data only in the clear channel. Indicators 1373 and 1375 indicating the results of CCA are also transmitted to the base station as indicated in 1361 and 1363, if the terminal is allocated with the subframes 1351 and 1353 for transmitting the data corresponding to the HARQ process ID 2 and the data corresponding to the HARQ process ID 3 in the next UL grant 1305 following the UL grant 1303 and detects the clear channel as the results of CCA, as indicated by 1361 and 1363.

Figure 14:
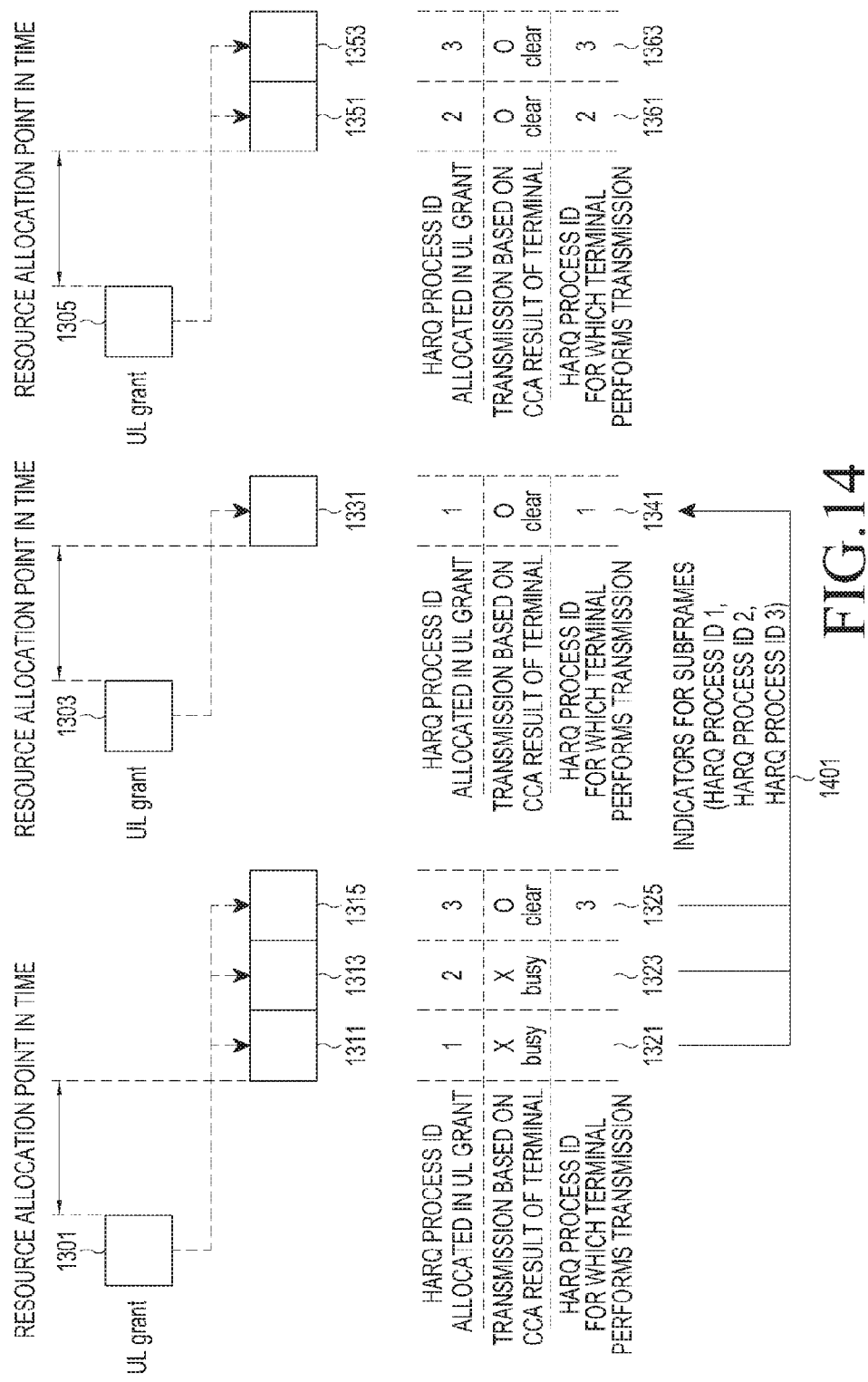
FIG. 14 is a diagram showing another embodiment where a base station schedules multiple subframes for a terminal when the terminal and the base station use an asynchronous HARQ scheme in an unlicensed frequency band.

FIG. 14 is a diagram showing another embodiment where a base station schedules multiple subframes for a terminal when the terminal and the base station use an asynchronous HARQ scheme in an unlicensed frequency band.

More specifically, a situation of FIG. 14 is the same as that of FIG. 13. The same operations of FIG. 14 as in FIG. 13 will be referred to as the same reference numerals.

The embodiment shown in FIG. 14 is different from the embodiment of FIG. 12 and the embodiment of FIG. 13 in that indicators regarding multiple subframes allocated to the terminal are transmitted to the base station, collectively rather than individually.

Referring to FIG. 14, the base station schedules for the terminal the three subframes 1311, 1313, and 1315 in the first UL grant 1301. Thereafter, the terminal collectively transmits indicators (1401) corresponding to the three subframes 1311, 1313, and 1315 in the subframe 1331 allocated in the next UL grant 1303, instead of separately transmitting the indicators (1401). If multiple subframes are allocated in the UL grant, the subframe in which the indicators are to be collectively transmitted may be one selected from among the multiple subframes.

Figure 15:
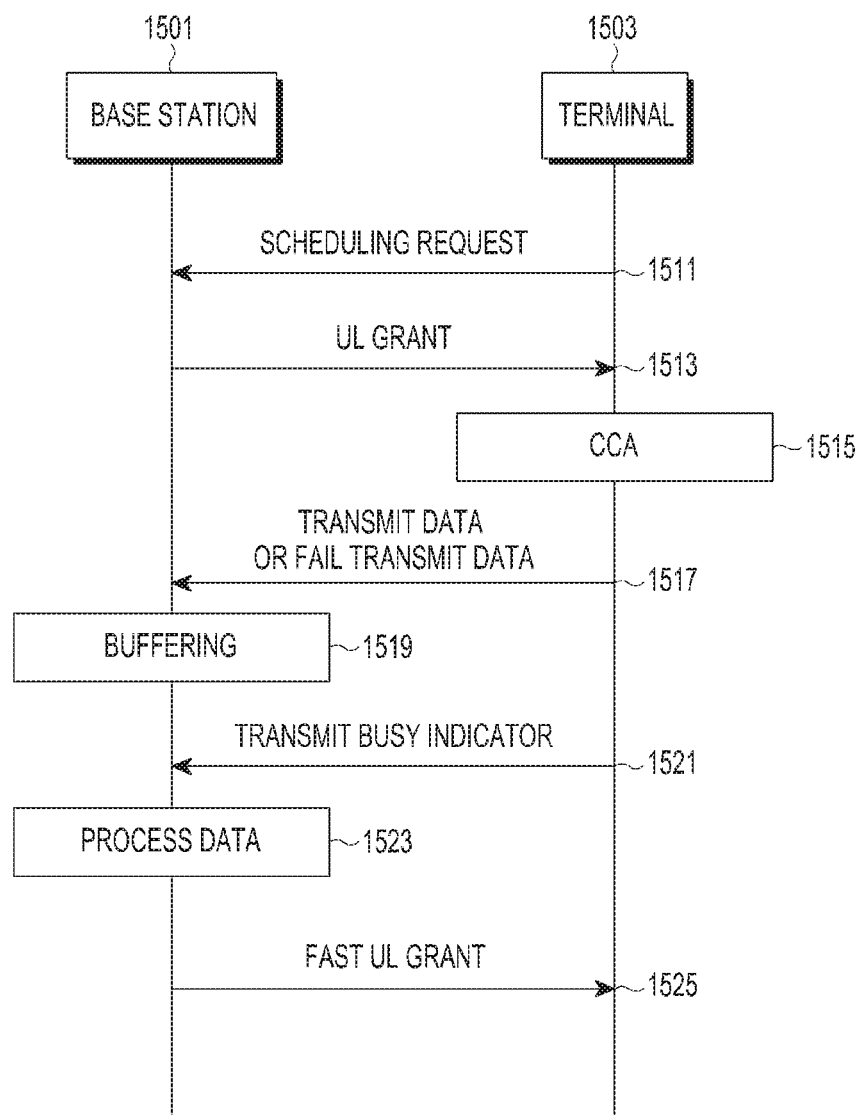
FIG. 15 is a flowchart showing an example of transmission and reception of data or a control signal between a terminal and a base station that use an unlicensed frequency band in a carrier aggregation (CA) system according to the present disclosure.

FIG. 15 is a flowchart showing an example of transmission and reception of data or a control signal between a terminal and a base station that use an unlicensed frequency band in a CA system according to the present disclosure.

A terminal 1503 sends a scheduling request to a base station 1501 in operation 1511.

The base station 1501 performs scheduling in response to the scheduling request of the terminal 1503 and transmits an UL grant to the terminal 1503 in operation 1513. The terminal 1503 having received the UL grant prepares for transmitting data. More specifically, the terminal 1503 encodes data to be transmitted.

The terminal 1503 performs CCA at an allocated point in time in operation 1515.

The terminal 1503 may not transmit data if the unlicensed frequency band is busy (i.e., the busy channel), whereas if the unlicensed frequency band is clear (i.e., the clear channel), the terminal 1503 transmits the data in operation 1517.

The base station 1501 buffers data received from the terminal 1503 even if not knowing whether the terminal 1503 has transmitted the data in operation 1519.

The terminal 1503 transmits a busy indicator to the base station 1501 in operation 1521 if failing to transmit the data because the unlicensed frequency band is busy in operation 1515. The base station 1501 has to know transmission/reception points in time of the busy indicator in advance. In case of the CA system, the terminal 1503 may transmit the busy indicator by using a cell using a licensed frequency band. The busy indicator indicates that the data has not been transmitted using a resource allocated by the base station 1501 because the terminal 1503 detects the busy channel as a result of CCA.

However, if the terminal 1503 has transmitted the data because the unlicensed frequency band is clear, the terminal 1503 may not transmit the busy indicator. Alternatively, the terminal 1503 may transmit the data without indicating the busy indicator. The terminal 1503 may transmit the busy indicator together with the data in operation 1517.

The busy indicator needs to be transmitted before the terminal 1503 transmits next data. The busy indicator may be transmitted using a cell using the unlicensed frequency band or a cell using the licensed frequency band. The busy indicator may be transmitted through a PUSCH, a PUCCH, a sounding reference signal (SRS), or an RS including a particular sequence of the cell using the unlicensed frequency band. The busy indicator may be transmitted through a PUSCH, a PUCCH, an SRS, or an RS including a particular sequence of the cell using the licensed frequency band. The busy indicator may be transmitted together with a UCI of a feedback with respect to DL data. A resource for transmitting the busy indicator may be periodically allocated or, in a particular case, aperiodically allocated. The particular case may be, for example, a case where the base station determines that the terminal performs CCA and detects the busy state. In the particular case, the base station may allocate a resource for aperiodic transmission of the busy indicator together with an NACK signal. Alternatively, in the particular case, the base station may allocate a resource for aperiodic transmission of the busy indicator using an NACK signal and an UL grant signal.

In operation 1523, the base station 1501 processes the data by determining, based on the busy indicator, a result of CCA performed by the terminal 1503 and whether the terminal 1503 has transmitted depending on the result. The base station 1501 does not discard the buffered data if determining that the terminal 1503 has transmitted the data. However, if determining that the data has not been transmitted, the base station 1501 discards the buffered data.

Since the base station 1501 receives the busy indicator from the terminal 1503 after granting scheduling to the terminal 1503 in operation 1513, the base station 1501 may know that the terminal 1503 is ready to transmit the data.

Thus, the base station 1501 transmits a fast UL grant rather than the UL grant in operation 1525 to allow the terminal 1503 to transmit the transmission-ready data fast. Since the terminal 1503 is ready to transmit data in operation 1513, the base station 1501 may transmit the fast UL grant to the terminal 1503.

Table 1 shows an example of the fast UL grant. More specifically, Table 1 shows information omittable from a UL grant of a Long Term Evolution (LTE) DCI format 0 to indicate the fast UL grant.

TABLE 1

| Items of UL grant (DCI format 0) | Number of Bits | Information Omittable in fast UL grant |
|---|---|---|
| Format 0/format 1A flag | 1 | |
| Hopping flag | 1 | |
| Resource block allocation | Variable (5-13 bits) | Omittable (in case of no change in resource allocation) |
| MCS and redundancy version | 5 | Omittable (allocate fast UL grant in case of no change in MCS and RV) |
| New data indicator | 1 | Omittable |
| TPC command | 2 | |
| Cyclic shift for DM-RS | 3 | Omittable |
| CQI request | 1 | Omittable |
| Padding | Variable (1-2 bits) | |
| Fast UL transmission timing | 2 | Addable |

The fast UL grant may have an identifier added to the UL grant (DCI format 0) for distinguishment from the UL grant. To reduce the complexity of implementation of the terminal, information indicating the fast UL grant may be transmitted in a determined manner only in a particular case. The particular case may be, for example, a case where the identifier is transmitted only through the cell using the licensed frequency band. The predetermined manner may be transmission of the identifier between operation 1517 and operation 1521 and between operation 1521 and operation 1525. The fast UL grant may be transmitted in a subframe that is set based on a preset time offset. The preset time offset may be transmitted using radio resource control (RRC).

Fast UL transmission timing may be added to the UL grant (DCI format 0). The fast UL transmission timing may also be transmitted using the RRC.

A position of an UL resource may be indicated by a resource block assignment (RBA) field. The number of resource blocks (RBs) with respect to a system bandwidth is given as a constant. The number of allocated RBs may be floor(RBA/Max_RB)+1. The floor function outputs a desired multiple to which an input value is rounded down. A start RB (RB_offset) of the UL resource may be obtained using an RBA mod Max RB. RB_offset may be transmitted in an UL grant in initial transmission. Thereafter, RB_offset may be changed using a physical HARQ indicator channel (PHICH) in re-transmission. The base station may use the PHICH to change a cyclic shift of RB_offset and DM-RS for a re-transmission packet. In the present disclosure, if the terminal 1513 detects the busy state as a result of performing CCA in operation 1515, it means that data has been encoded, such that the base station 1501 may cause the terminal 1503 to transmit data after changing only RB_offset. Alternatively, the base station 1501 may cause the terminal 1503 to transmit data after changing the cyclic shift of RB_offset and the DM-RS. The base station 1501 may adjust RB_offset in one subframe to prevent collision between a fast UL grant transmitted to another device and a fast UL grant transmitted to the terminal 1503.

Figure 16:
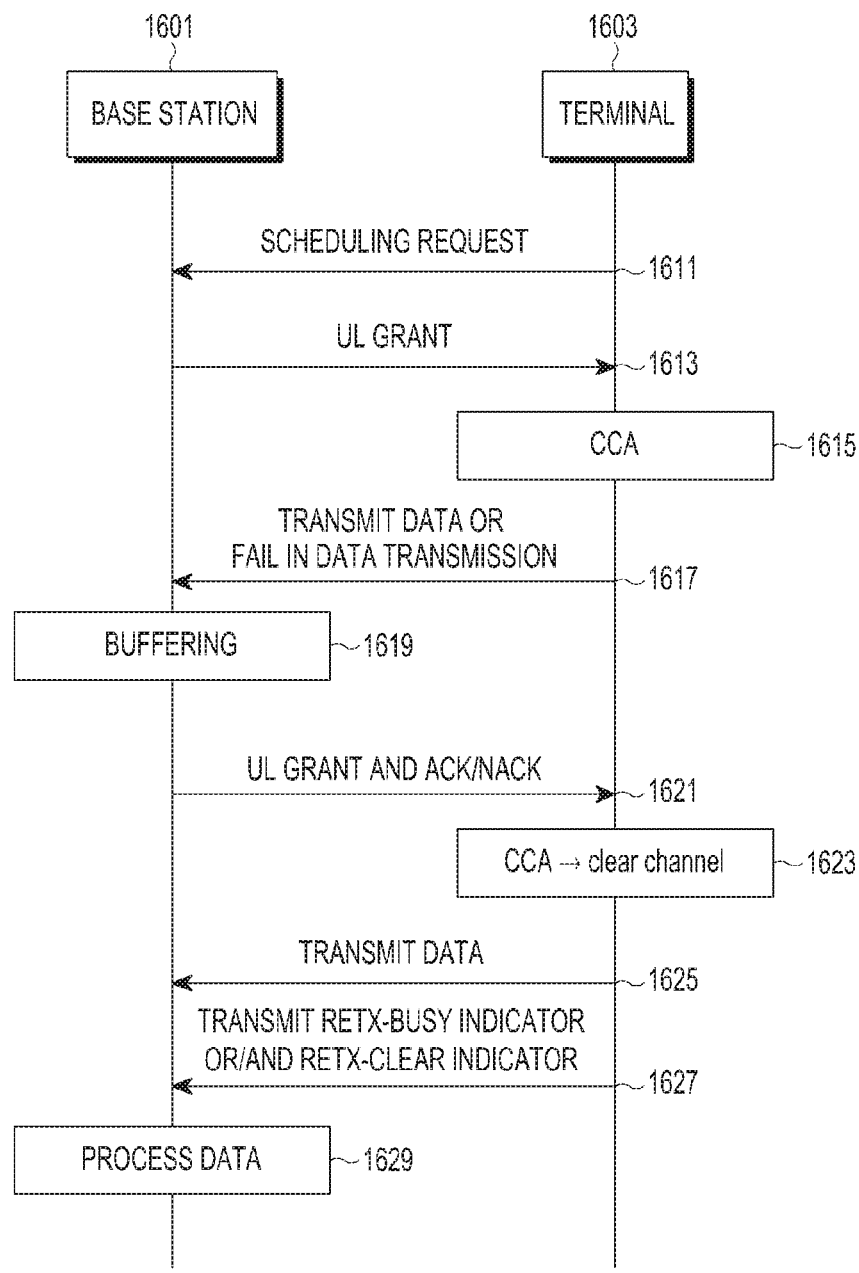
FIG. 16 is a flowchart showing another example of transmission and reception of data or a control signal between a terminal and a base station that use an unlicensed frequency band according to the present disclosure.

FIG. 16 is a flowchart showing another example of transmission and reception of data or a control signal between a terminal and a base station that use an unlicensed frequency band according to the present disclosure.

A terminal 1603 sends a scheduling request to a base station 1601 in operation 1611.

The base station 1601 performs scheduling in response to the scheduling request of the terminal 1603 and transmits a scheduling result (UL grant) to the terminal 1603 in operation 1613.

The terminal 1603 performs CCA at an allocated point in time in operation 1615.

The terminal 1603 may not transmit data if the unlicensed frequency band is busy (i.e., the busy channel), whereas if the unlicensed frequency band is clear (i.e., the clear channel), the terminal 1503 transmits the data in operation 1617.

The base station 1601 buffers data received from the terminal 1603 even if not knowing whether the terminal 1603 has transmitted the data in operation 1619.

When sending a NACK signal to the terminal 1603, the base station 1601 performs scheduling again because of expecting re-transmission of data from the terminal 1603, and transmits a scheduling result (UL grant) to the terminal 1603 in operation 1621.

The terminal 1603 performs CCA at an allocated point in time. The terminal 1603 detects the clear state of the unlicensed frequency band in operation 1623.

In operation 1625, the terminal 1603 transmits the data as a result of CCA performed in operation 1615. That is, if terminal 1603 detects the clear channel as a result of CCA, transmits data, and receives a NACK signal from the base station 1601 in operation 1617, the terminal 1603 re-transmits the data transmitted in operation 1617. The terminal 1603 may also transmit an ReTx-Clear indicator. The ReTx-Clear indicator indicates combining previously received data with currently received data.

However, if the terminal 1603 detects the busy channel as a result of CCA, fails to transmit data, and receives a NACK signal from the base station 1601 in operation 1617, the terminal 1603 transmits the data that is attempted to be transmitted in operation 1617. The terminal 1603 may also transmit an ReTx-Busy indicator. The ReTx-Busy indicator indicates removing previously received data from a buffer.

The terminal 1603 may use both ReTx-Clear indicator and ReTx-Busy indicator or one of them. For example, if only the ReTx-Clear indicator is used, the ReTx-Clear indicator may have a meaning of the ReTx-Clear indicator or the ReTx-Busy indicator according to whether the ReTx-Clear indicator is indicated or not. Alternatively, if only the ReTx-Busy indicator is used, the ReTx-Busy indicator may have a meaning of the ReTx-Clear indicator or the ReTx-Busy indicator according to whether the ReTx-Busy indicator is indicated or not. The ReTx-Clear indicator or the ReTx-Busy indicator may be transmitted using a PUCCH.

The base station 1601 processes the data based on the ReTx-Clear indicator or the ReTx-Busy indicator in operation 1629.

FIGS. 17A to 17C are diagrams showing a buffer processed according to the present disclosure. FIG. 17A shows a buffer of a base station operating in a licensed frequency band. FIG. 17B and FIG. 17C show a buffer of a base station operating in an unlicensed frequency band.

Referring to FIG. 17A, in the licensed frequency band, the terminal has to transmit data (hereinafter, referred to as 'first received data') at a point in time allocated by the base station. Thus, if the base station fails in decoding, the base station performs combining (or HARQ combining) with data (hereinafter, referred to as 'second received data') re-transmitted by the terminal. The base station may perform processing only with one buffer.

On the other hand, in the unlicensed frequency band, it is not certain that the terminal transmits data at a point in time allocated by the base station. Thus, the base station may not process the buffer like in the licensed frequency band. The base station performs combining with re-transmitted data (the second received data) only when the terminal transmits the data (the first received data).

Figure 17:
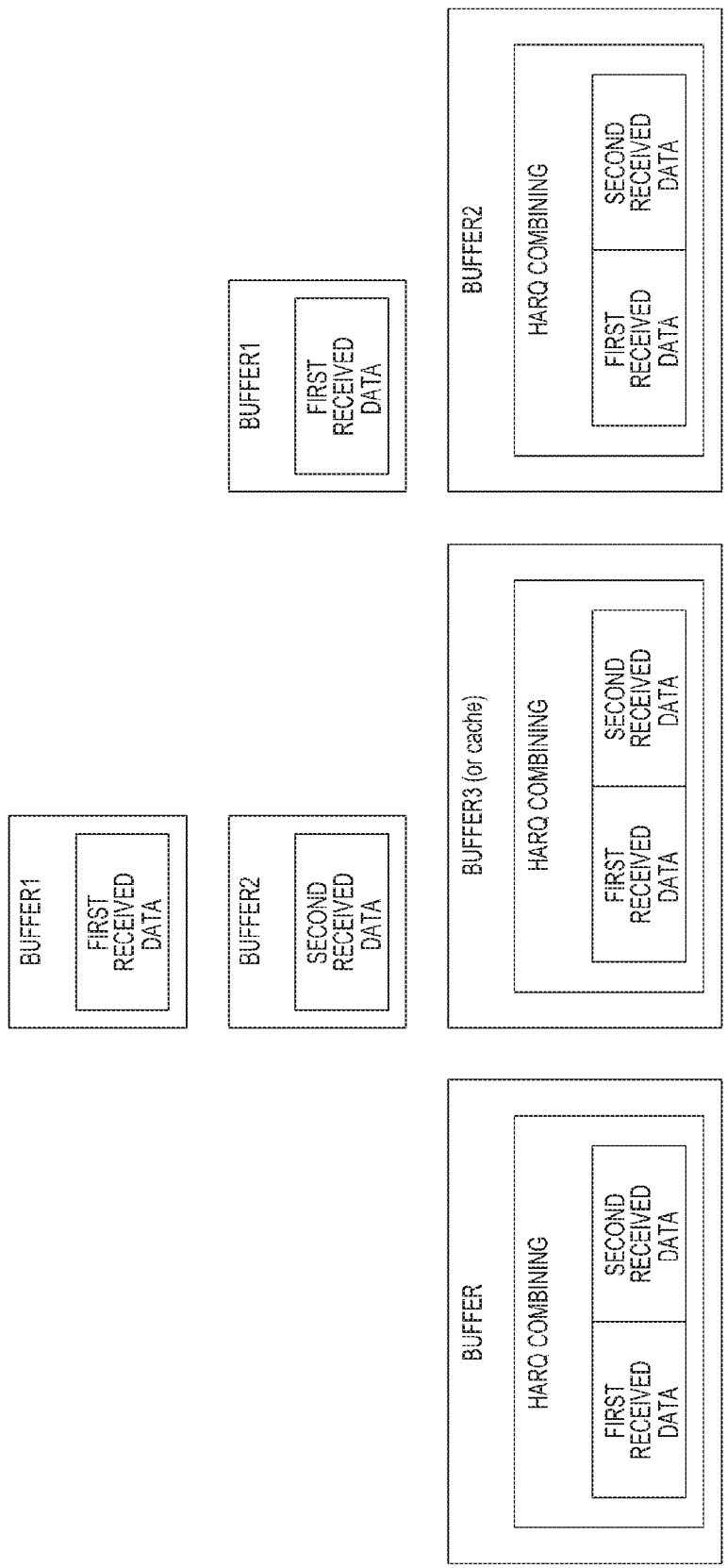
FIGS. 17A to 17C are diagrams showing a buffer processed according to the present disclosure.

Although FIG. 17 shows the buffer of the base station, FIG. 17 may show the buffer of the terminal if a proposal of the present disclosure is applied to a DL.

Figure 18:
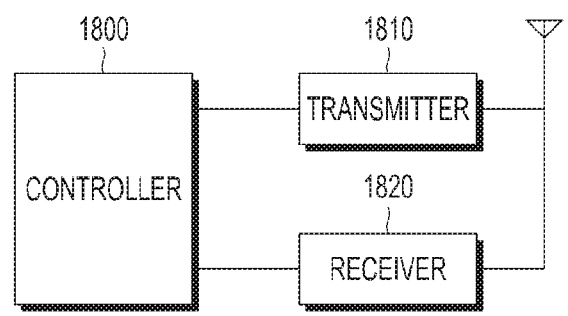
FIG. 18 is a block diagram of a terminal according to an embodiment of the present disclosure.

FIG. 18 is a block diagram of a terminal according to an embodiment of the present disclosure. For convenience of a description, elements that are not directly related to the present disclosure will not be illustrated and described.

Referring to FIG. 18, the terminal may include a controller 1800, a transmitter 1810, and a receiver 1820. Herein, the present disclosure has been described using multiple elements, but if necessary, the above-described operations may be performed by a single element. The controller 1800 controls the transmitter 1810 and the receiver 1820, and performs operations of the terminal related to the above-described methods according to the embodiments of the present disclosure. The transmitter 1810 and the receiver 1820 are elements for communication with the base station, etc., and perform operations related to a scheduling request to the base station, transmission and reception of data, transmission and reception of indicators, etc., under control of the controller 1800.

Figure 19:
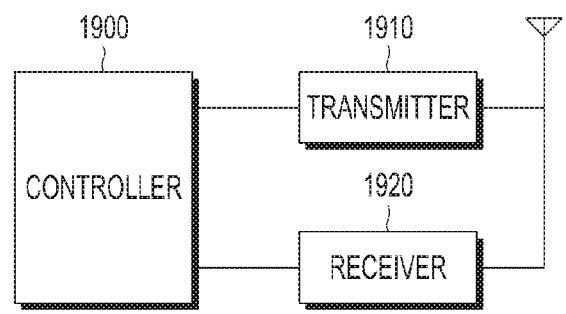
FIG. 19 is a block diagram of a base station according to an embodiment of the present disclosure.

FIG. 19 is a block diagram of a base station according to an embodiment of the present disclosure. For convenience of a description, elements that are not directly related to the present disclosure will not be illustrated and described.

Referring to FIG. 19, the base station may include a controller 1900, a transmitter 1910, and a receiver 1920. Herein, the present disclosure has been described using multiple elements, but if necessary, the above-described operations may be performed by a single element. The controller 1900 controls the transmitter 1910 and the receiver 1920, and performs operations of the base station related to the above-described methods according to the embodiments of the present disclosure. The transmitter 1910 and the receiver 1920 are elements for communication with the terminal, etc., and perform operations related to a scheduling grant result to the terminal, transmission and reception of data, transmission and reception of indicators, etc., under control of the controller 1900.

The embodiments disclosed in the present specification and drawings have been provided to easily describe the present disclosure and to help understanding of the present disclosure, and are not intended to limit the scope of the present disclosure. That is, it would be obvious to those of ordinary skill in the art that other variations and modifications can be made to the disclosed embodiments based on the technical spirit of the present disclosure. In addition, the embodiments may be used in combination if necessary.

The invention claimed is:

1. A method for transmitting and receiving data by a terminal in a communication system, the method comprising:
   receiving, from a base station, a first scheduling response associated with a scheduling request of the terminal;
   identifying, based on the received first scheduling response, a first state of a channel between the terminal and the base station;
   receiving, from the base station, a negative acknowledge (NACK) signal in response to first uplink (UL) data transmitted by the terminal and a second scheduling response;
   identifying, based on the received second scheduling response, a second state of the channel;
   transmitting, based on the identified second state of the channel, second UL data; and
   transmitting a first indicator indicating whether the second UL data is re-transmitted data based on the identified first state, a second indicator included in the first scheduling response, and the identified second state of the channel.

2. The method of claim 1, wherein the first indicator indicates that the second UL data is re-transmitted data, if the identified first state indicates that the channel is not occupied by other terminal.

3. The method of claim 2, wherein the first indicator further comprises a hybrid automatic repeat request (HARM) redundancy version (RV) of the second UL data.

4. The method of claim 1, wherein the first indicator indicates that the second UL data is new data, if the identified first state indicates that the channel is occupied by other terminal.

5. The method of claim 1, wherein the first indicator is transmitted using a physical uplink shared channel (PUSCH) or a physical uplink control channel (PUCCH).

6. The method of claim 1, wherein the NACK signal is received based on a detection failure of a reference signal (RS) by the base station and the RS is a demodulation reference signal (DM-RS) or cell specific reference signal (CRS).

7. A method for transmitting and receiving data by a base station in a communication system, the method comprising:
transmitting to a terminal, a first scheduling response with respect to a scheduling request of the terminal;
receiving first uplink (UL) data in response to the first scheduling response;
detecting a reference signal (RS) of first uplink (UL) data;
transmitting to the terminal, based on the detection of the RS, a negative acknowledge (NACK) signal responding to the first UL and a second scheduling response; and
receiving second UL data and a first indicator indicating whether the second UL data is re-transmitted data, in response to the second scheduling response,
wherein the first indicator is received based on a first state identified by the terminal in response to the first scheduling response, a second indicator included in the first scheduling response, and a second state of a channel identified by the terminal in response to the second scheduling response.

8. The method of claim 7, wherein the second indicator indicates that the detection of the RS is fails even if the first scheduling response is transmitted.

9. The method of claim 7, wherein the NACK signal is transmitted based on a detection failure of a reference signal (RS) by the base station and the RS is a demodulation reference signal (DM-RS) or cell specific reference signal (CRS).

10. The method of claim 7, further comprising:
processing the second UL data according to the first indicator indicating whether the second UL data is re-transmitted data.

11. The method of claim 10, wherein the processing of the second UL data comprises:
soft-combining the first UL data with the second UL data, if the first indicator indicates that the second UL data is re-transmitted data.

12. The method of claim 10, wherein the processing of the second UL data comprises:
discarding the first UL data, if the first indicator indicates that the second UL data is new data.

13. The method of claim 7, wherein the receiving the first UL data is based on the first state and receiving the second UL data is based on the second state.

14. A terminal in a communication system for transmitting and receiving data, the terminal comprising:
a transceiver configured to communicate with a base station; and
a processor coupled with the transceiver and configured to:
receive a first scheduling response associated with a scheduling request of the terminal,
identify, based on the received first scheduling response, a first state of a channel between the terminal and the base station,
receive, from the base station, a negative acknowledge (NACK) signal responding to first uplink (UL) data transmitted by the terminal and a second scheduling response;
identify, based on the received second scheduling response, a second state of the channel;
transmit, based on the identified second state of the channel, second UL data; and
transmit a first indicator indicating whether the second UL data is re-transmitted data based on the identified first state, a second indicator included in the scheduling response, and the identified second state of the channel.

15. The terminal of claim 14, wherein:
the first indicator indicates that the second UL data is re-transmitted data if the identified first state indicates that the channel is not occupied by other terminal, and
the first indicator indicates that the second UL data is new data, if the identified first state indicates that the channel is occupied by other terminal.

16. A base station in a communication system for transmitting and receiving data, the base station comprising:
a transceiver configured to communicate with a terminal; and
a processor coupled with the transceiver and configured to:
transmit a first scheduling response with respect to a scheduling request of the terminal,
receive first uplink (UL) data in response to the first scheduling response,
detect a reference signal (RS) of first uplink (UL) data,
transmit to the terminal, based on the detection of the RS, a negative acknowledge (NACK) signal responding to the first UL and a second scheduling response, and
receive second UL data and a first indicator indicating whether the second UL data is re-transmitted data, in response to the second scheduling response,
wherein the first indicator is received based on a first state identified by the terminal in response to the first scheduling response, a second indicator included in the first scheduling response, and a second state of a channel identified by the terminal in response to the second scheduling response.

17. The base station of claim 16, wherein the processor further configured to:
process the second UL data according to the first indicator indicating whether the second UL data is re-transmitted data.

18. The base station of claim 16, wherein the processor further configured to:
receive the first UL data based on the first state and receive the second UL data based on the second state.

* * * * *